(12) United States Patent
Aye et al.

(10) Patent No.: US 6,169,594 B1
(45) Date of Patent: Jan. 2, 2001

(54) BEAM DEFLECTOR AND SCANNER

(75) Inventors: Tin M. Aye, Mission Viejo; Gajendra D. Savant, Torrance, both of CA (US)

(73) Assignee: Physical Optics Corporation, Torrance, CA (US)

(*) Notice: Under 35 U.S.C. 154(b), the term of this patent shall be extended for 0 days.

(21) Appl. No.: 09/139,152

(22) Filed: Aug. 24, 1998

(51) Int. Cl.$^7$ ..................................... G02F 1/13

(52) U.S. Cl. ........................................ 349/196; 359/245

(58) Field of Search ................... 349/1, 196; 359/245, 359/253, 259, 262, 832, 246, 251, 252, 261, 831, 290

(56) References Cited

U.S. PATENT DOCUMENTS

| | | | |
|---|---|---|---|
| 4,367,463 | 1/1983 | Suzuki et al. | 345/9 |
| 4,729,640 | * 3/1988 | Sakata | 350/348 |
| 4,775,853 | 10/1988 | Borruate | 340/521 |
| 4,838,630 | 6/1989 | Jannson et al. | 359/3 |
| 4,898,450 | 2/1990 | Jannson et al. | 385/50 |
| 4,923,269 | 5/1990 | Healey | 349/196 |
| 4,926,412 | 5/1990 | Jannson et al. | 359/130 |
| 4,958,892 | 9/1990 | Jannson et al. | 359/15 |
| 5,018,814 | 5/1991 | Jannson et al. | 385/28 |
| 5,026,131 | 6/1991 | Jannson et al. | 359/15 |
| 5,067,788 | 11/1991 | Jannson et al. | 385/2 |
| 5,083,219 | 1/1992 | Jannson et al. | 359/1 |
| 5,153,670 | 10/1992 | Jannson et al. | 356/301 |
| 5,221,957 | 6/1993 | Jannson et al. | 356/301 |
| 5,230,969 | 7/1993 | Savant et al. | 430/2 |
| 5,245,404 | 9/1993 | Jannson et al. | 356/301 |
| 5,260,826 | 11/1993 | Wu | 359/368 |
| 5,276,537 | 1/1994 | Savant et al. | 359/3 |
| 5,278,687 | 1/1994 | Jannson et al. | 359/125 |
| 5,293,272 | 3/1994 | Jannson et al. | 359/1 |
| 5,305,123 | 4/1994 | Sadovnik et al. | 359/4 |
| 5,307,186 | 4/1994 | Izumi et al. | 349/24 |
| 5,365,354 | 11/1994 | Jannson et al. | 359/15 |
| 5,384,221 | 1/1995 | Savant et al. | 430/19 |
| 5,396,350 | 3/1995 | Beeson et al. | 349/62 |
| 5,430,561 | 7/1995 | Kato et al. | 349/202 |
| 5,461,475 | 10/1995 | Lerner et al. | 356/300 |
| 5,485,277 | 1/1996 | Foster | 356/445 |
| 5,497,430 | 3/1996 | Sadovnik et al. | 382/156 |
| 5,534,386 | 7/1996 | Petersen et al. | 430/320 |
| 5,555,109 | 9/1996 | Zimmerman et al. | 349/57 |
| 5,572,228 | 11/1996 | Manasson et al. | 343/785 |

(List continued on next page.)

* cited by examiner

*Primary Examiner*—James A. Dudek
(74) *Attorney, Agent, or Firm*—Nilles & Nilles, S.C.

(57) ABSTRACT

A beam deflector comprising a pair of mated microprism arrays with one of the arrays comprised of a variable refractive index material capable of being selectively changed in response to a field whose magnitude or intensity is regulated by regulating voltage applied. The other array preferably is comprised of a material having a constant refractive index. A conductive layer is disposed on both sides of the variable refractive index array. A pane preferably is disposed in front and behind the arrays. Two pairs of the arrays can be arranged parallel to each other with their microprisms generally perpendicular forming a two-dimensional deflector. To achieve a deflection response time faster than 100 $\mu s$, each prism has a height no larger than about 20 $\mu m$ and a width preferably no greater than about 100 $\mu m$. Preferably, each prism height is less than about 15 to about 10 $\mu m$ to achieve a response time 30 $\mu s$ or faster. A method of making the deflector includes using direct-write electron beam lithography to make a master for replicating arrays having a height of 10 $\mu m$ or less. A pair of deflectors can be used to deflect a beam in two dimensions and can be used in a scanner. Where the beam is a laser, the deflector can be used in a laser imaging radar assembly. Such a scanner and laser imaging radar assembly provide fast scanning of an object or region advantageously without requiring the deflector to move during scanning.

43 Claims, 15 Drawing Sheets

U.S. PATENT DOCUMENTS

| | | | |
|---|---|---|---|
| 5,609,939 | 3/1997 | Petersen et al. | 428/141 |
| 5,619,373 | 4/1997 | Meyerhofer et al. | 359/482 |
| 5,629,996 | 5/1997 | Rizkin et al. | 385/31 |
| 5,631,754 | 5/1997 | Jannson et al. | 349/64 |
| 5,633,623 | 5/1997 | Campman | 340/321 |
| 5,648,859 * | 7/1997 | Hirabayashi et al. | 349/9 |
| 5,657,162 | 8/1997 | Nilsen et al. | 359/530 |
| 5,660,181 | 8/1997 | Ho et al. | 600/408 |
| 5,694,498 | 12/1997 | Manasson et al. | 385/15 |
| 5,735,988 | 4/1998 | Chau et al. | 156/209 |
| 5,739,931 | 4/1998 | Zimmerman et al. | 359/619 |
| 5,743,633 | 4/1998 | Chau et al. | 362/331 |
| 5,764,317 | 6/1998 | Sadovnik et al. | 349/5 |
| 5,771,320 | 6/1998 | Stone | 385/16 |
| 5,796,881 | 8/1998 | Manasson et al. | 385/19 |
| 5,815,124 | 9/1998 | Manasson et al. | 343/785 |
| 5,838,403 | 11/1998 | Jannson et al. | 349/65 |
| 5,841,500 | 11/1998 | Patel | 349/141 |
| 5,842,767 | 12/1998 | Rizkin et al. | 362/297 |
| 5,886,670 | 3/1999 | Manasson et al. | 343/772 |
| 5,886,675 | 3/1999 | Aye et al. | 345/7 |

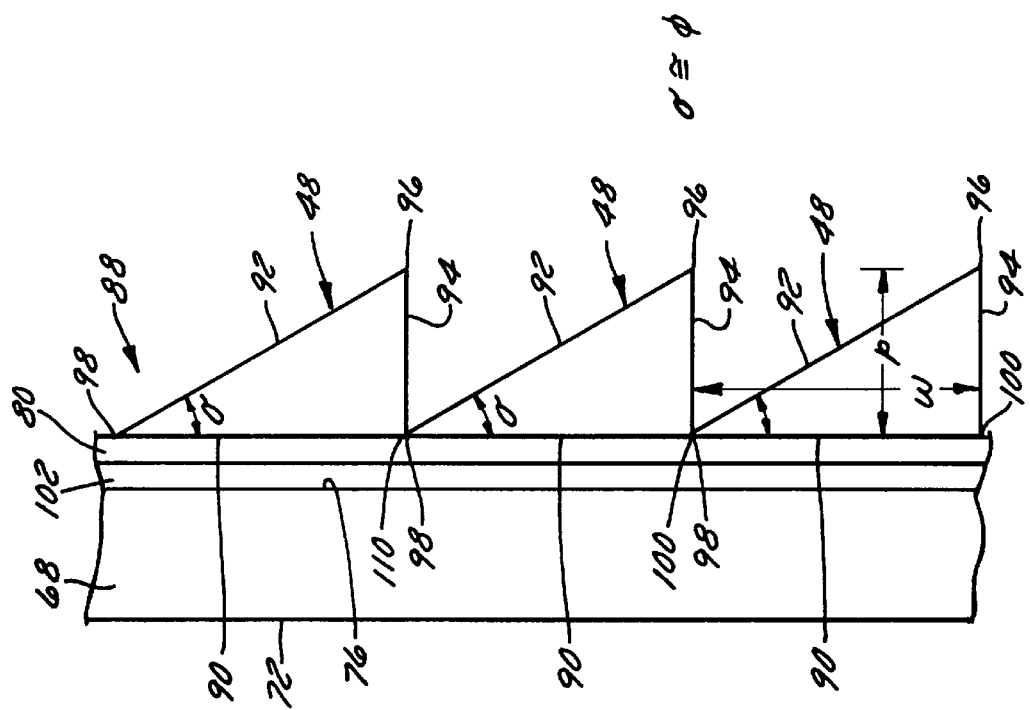
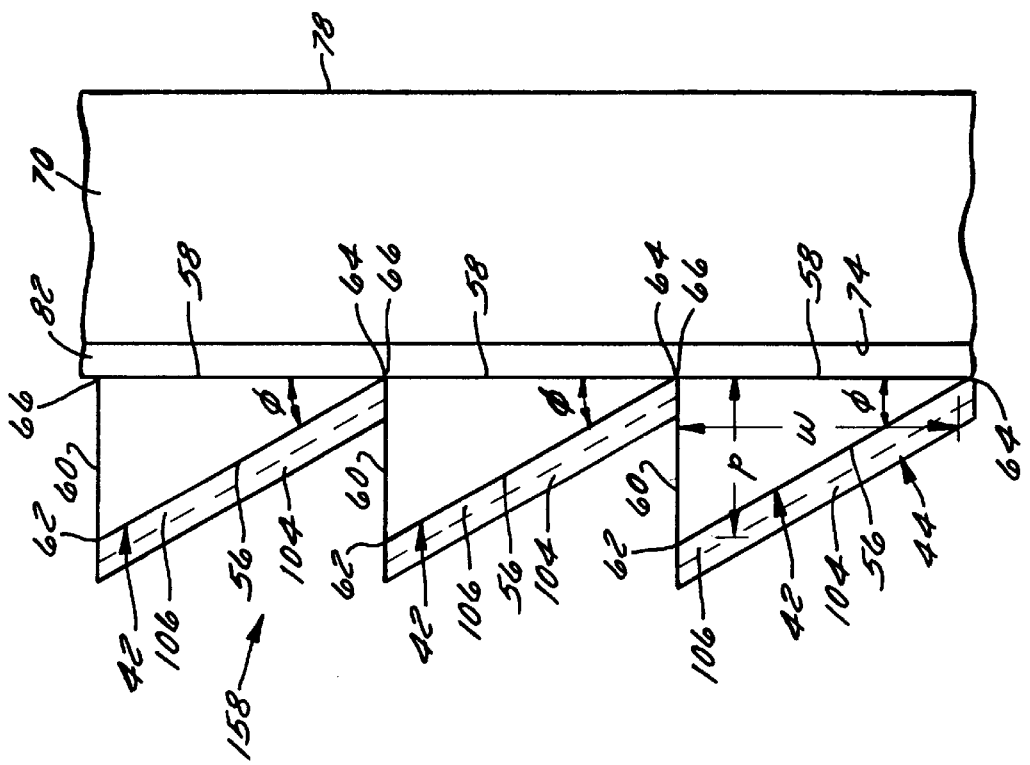

BEAM DEFLECTOR AND SCANNER

FIELD OF THE INVENTION

The present invention relates to a beam deflector for deflecting a beam of electromagnetic energy and more particularly to (1) a beam deflector that comprises at least one mated pair of arrays of microprisms that can selectively change the angle of a beam of light for use in scanning light beams from and on an object spaced from the array, (2) a method of making the beam deflector, and (3) a scanner using the beam deflector that is capable of one-dimensional, two-dimensional or three-dimensional scanning, such as for use in laser radar or other scanning and imaging applications.

BACKGROUND OF THE INVENTION

In the past, it has been known to use a microprism array to selectively change the angle of a beam of light passing through the array. One such array is disclosed in an article entitled *Free-space optical interconnections with liquid-crystal microprism arrays,* Katsuhiko Hirabayashi, Tsuyoshi Yamamoto, and Masayasu Yamaguchi, Vol. 34, No. 14, *Applied Optics,* May 10, 1995. However, one drawback of the disclosed array is that it uses undesirably large microprisms, limiting how fast the array can react to change the angle of light passing through it. Moreover, a further drawback is that the disclosed beam that passes through the array has to have a diameter less than the size of one of its microprisms which is about 100 microns which thereby limits its use for large area distortion-free scanning. Still further, by the array using such a large diameter beam, the array is unsuitable for use in an image or object scanner because its resolution would be extremely poor. As a result, the disclosed array is impractical for commercial applications, such as optical interconnections and optical switches disclosed, because these applications require much higher switching speeds than what the array will provide. Due to the relatively slow switching speed of the array and the poor resolution that results from the rather large size, i.e. large pitch, microprism used, the array cannot be used for scanning applications (1) where an object remote from the array is being scanned with the beam, or (2) where light from an object or source remote from the array is being scanned.

In the past, scanners have been made up of mirrors and motors that quickly and precisely move or vibrate the mirrors to position a light beam emitted from a light source. However, such mechanical systems have a less than desirable scanning speed because the inertia of each moving object slows scanning.

More recently, the need to rapidly scan and steer a beam of light energy, typically from a laser, has led to the development of optical systems with low rotational or translational inertia because movement of mechanical components is kept to a minimum. Examples of these developments include deformable mirror arrays based on integrated circuit technology, a binary optics microlens array concept based on the mechanical movement of a complementary pair of microlens arrays, a liquid crystal scanner based on diffraction using liquid crystal phase gratings, and a conical beam scanner and collector based on a holographic plate.

Unfortunately, all of these developments have drawbacks and limitations. For example, the deformable mirror scanner is costly to manufacture, is limited to small apertures and low scanning speeds, and, perhaps worst of all, can only scan a single dimension. The microlens array requires a special aspheric structure and non-planar movement to achieve acceptable beam collimation quality. In addition, the microlens array requires complex high voltage and bulky piezoelectric mechanical drivers for non-planar movement and is limited to relatively slow kilohertz scanning speeds. The liquid crystal diffractive beam deflectors are, at best, experimental and have small diffraction angles, less than optimal diffraction efficiencies, and a great deal of noise. Lastly, rotating holographic optical elements or plates are also undesirably limited to one-dimensional conical scanning, as the beam is emitted only along the surface of a cone, which therefore requires in-plane rotation of the holographic optical elements.

What is needed is a device that can efficiently change the direction of light without the apparatus having to move. What is further needed is a microprism array capable of changing the direction of a beam of light from an object having a large diameter without distorting the beam sufficiently quickly so as to be suitable for commercial applications. What is also needed is a beam deflector that can be used in scanners that scans light from a light source as well as light received from an object. What is still further needed is a microprism array suitable for use in a scanner using a source of light that scans an object or series of objects located remote from the array. What is additionally needed is a microprism array that can be used in a scanner capable of two-dimensional scanning or three-dimensional scanning. What is still additionally needed is a scanner that has no moving parts and which can be used to scan terrain, images, retinas, as well as any other object or indicia capable of being scanned.

SUMMARY OF THE INVENTION

A beam deflector composed of a pair of mated prism arrays with one of the arrays comprised of a material having a refractive index that remains substantially constant and the other of the arrays comprised of a material having a refractive index that can be selectively varied. During operation, a field that is either an electric field or a magnetic field is selectively applied to the array of variable refractive index material to control the angle a beam is deflected as it passes through the beam deflector. The field intensity, flux or flux density is controlled by selective application of voltage to terminals of the beam deflector. The flux lines of the field preferably extend generally parallel to the length of the variable refractive index prism. The beam deflector preferably does not move during operation.

Each array comprises a prism having a height, a width, and a length longer than either its height or width. Each prism preferably has a generally triangular cross-section that can comprise a right triangle. Each prism has a face disposed toward the incoming beam, a face from which the beam exits after it passes through the prisms, and a sidewall face. To quickly respond to the presence or absence of a field or a change in the field, the variable refractive index prism has a height no greater than about 20 $\mu$m such that it is a microprism that responds within about 100 $\mu$s. In other preferred embodiments, prism heights smaller than 15 $\mu$m and preferably smaller than 10 $\mu$m are preferred for responding as fast as about 30 $\mu$s or faster. The variable refractive index prism also has an apex angle between about 10° and about 60° and can have its refractive index varied as much as 0.15–0.3, typically about 0.2, so as to deflect the beam by an angle of as much as 30° or more. Preferably, the refractive index is selectively variable such that the beam can be deflected accurately to within an angular resolution of about 0.5 milliradians. The refractive index of the variable refractive index prism is selectively variable so it can match the refractive index of the constant refractive index prism such that the beam is not deflected as it passes through. Each variable refractive index prism preferably is made of a liquid crystal material that is a nematic liquid crystal material or preferably is a ferroelectric crystal material.

Preferably, each array is comprised of a plurality of pairs of microprisms with the microprisms of one array received between the voids between adjacent microprisms of the other array such that the mated arrays preferably have a generally rectangular cross-section. The array comprised of variable refractive index microprisms is disposed such that the beam passes through it before passing through the array of constant refractive index microprisms.

The mated arrays preferably are disposed between a pair of panes with an electrically conductive layer on each side of the variable refractive index prisms defining a cell or panel assembly that is capable of functioning as beam deflector that can deflect the beam in one dimension. A spacer preferably is disposed between the panes and extends about the periphery of the arrays. Each of the panes and each layer of conductive material is at least partially optically transparent to the wavelength of the beam so as to minimize absorption of the beam as it passes through. Each of the panes also can serve as a substrate to which one of the microprism arrays adheres.

If desired, one of the conductive layers can be disposed between the microprism arrays. Such an arrangement preferably provides a non-uniform field through each variable refractive index microprism that effectively increases its apex angle thus increasing the maximum angle of deflection.

In another preferred embodiment, an array of variable refractive index microprisms can be sandwiched between a pair of arrays of constant refractive index microprisms to provide an increase in the maximum apex angle of the variable refractive index microprisms. If desired, the array of variable refractive index prisms can be a pair of joined arrays of the prisms such that each prism has an equiangular or equilateral triangular cross section.

There preferably is an alignment layer disposed between the pane adjacent the variable refractive index microprism array and the variable refractive index microprism array that can be rubbed parallel or perpendicular to the lengthwise direction of the microprisms to align molecules of the variable refractive index microprisms in a desired direction. Also to align the molecules, the face of each of the constant refractive index microprisms that is disposed adjacent the variable refractive index microprisms can also be rubbed parallel or perpendicular to the lengthwise direction of the variable refractive index microprisms.

To minimize and preferably prevent diffraction noise, a positive microlens array can be disposed in front of the panel assembly and a negative microlens array can be disposed behind the panel assembly. In another preferred embodiment, the negative microlens array can be disposed between the positive microlens array and the panel assembly. In a still further preferred embodiment, the widths of the prisms can vary in aperiodic repeating sequence such that the sum of the widths of a single sequence is larger than the wavelength of the beam. Preferably, the sum of the widths is at least about 100 times the wavelength of the beam.

To maintain the temperature of the panel assembly within a desired range, a temperature controller can be used. One such controller can include a heater that heats the panel assembly in response to sensed temperature to maintain it within the desired temperature range. Another such controller controls the voltage in response to sensed temperature to compensate for any variations in refractive index due to the temperature.

In fabricating the cells or panel assemblies, a master for replicating one of the microprism arrays, preferably the constant refractive index microprism array, is fabricated using a beam that etches an etch-resist material disposed on a substrate of the master to produce the desired three-dimensional master profile. The beam preferably is an ion beam because an ion beam is capable of etching valleys in the etch-resist material having a height small enough to produce sufficiently small microprisms needed to achieve the desired fast response times. The etch-resist material preferably is an ion-beam resist material or an e-beam resist material, such as polymethyl methacrylate, capable of being etched away when the beam impinges against it. Preferably, the master is fabricated using direct-write electron beam lithography that selectively irradiates the resist coating with a desired intensity and for a sufficient duration to produce the three-dimensional profile complementary to the microprism array sought to be replicated. The master can be used to make submasters that can be stitched together to make a larger master or can be used as a master in replicating microprism arrays.

In replicating the constant refractive index microprism array, a drop of a hardenable material is disposed between the pane and the master. The hardenable material flows into the valleys formed in the master between the ridges until it covers substantially all of the exterior surface of the master and is in contact with the pane or a coating on the pane. The hardenable material is then cured, preferably by application of ultraviolet light or by another curing method. A preferred hardenable material is an optical epoxy or the like.

The microprism array formed is placed into a vacuum oven with the other pane disposed over it and a vacuum is used to draw the variable refractive index material between the formed microprism array and the other pane. The variable refractive index material preferably is in liquid or flowable form. The vacuum preferably is used to draw the variable refractive index material between the seal between the other pane and the formed microprism array. Thereafter, the constant refractive index material is heated at a desired temperature before the vacuum is broken to remove the finished panel assembly.

Two of the panel assemblies can be used to construct a two-dimensional beam deflector and are oriented such that (1) the constant refractive index prisms of one of the panel assemblies are generally perpendicular to the constant refractive index prisms of the other one of the panel assemblies, and (2) the variable refractive index prisms of one of the panel assemblies are generally perpendicular to the variable refractive index prisms of the other one of the panel assemblies. A polarizer that preferably is an orthogonally aligned twisted nematic liquid crystal plate is disposed between the panel assemblies. The polarizer preferably is orthogonally aligned relative to one or both of the panel assemblies.

Digital control circuitry can be used to control both panel assemblies so as to scan the beam in two directions or dimensions such that the two-dimensional beam deflector can form part of a two-dimensional scanner. Such control circuitry preferably incudes a computer with software that coordinates use of at least one lookup table that supplies data to a pair of drivers so one of the drivers outputs the voltage to one of the panel assemblies needed to deflect the beam at a desired angle in one direction and the other of the drivers outputs the voltage to the other of the panel assemblies needed to deflect the beam at a desired angle in another direction.

In one preferred scanner assembly, a beam emitter emits a beam that is directed through the beam deflector to scan the beam on an object spaced from the deflector. One or more beams reflected from the object can pass in the opposite direction through the deflector where they are received by a detector that preferably processes the reflected beams into signals capable of being further analyzed, such as by a computer or the like.

Where the beam deflector is a two-dimensional beam deflector the beam can be scanned, for example, vertically and horizontally on the object as well as an area surrounding the object. In this manner, where the beam is a laser beam, the beam deflector can be used as part of a laser imaging radar scanner to scan terrain.

Preferably, the two-dimensional beam deflector is capable of scanning at least a 30° by 30° field of regard no slower than about 100 µs all without the deflector moving during scanning. Preferably, the scanner is therefore capable of repeatedly scanning a region within field of regard at a frame rate or speed of at least about ten kilohertz.

Objects, features and advantages of the present invention of a beam deflector include that it: is of completely solid-state construction which uses no moving parts; does not need to move during operation so periodic realignment is advantageously not required; is capable of deflecting a beam at an angle of 30° or more relative to its incoming direction in as fast as 30 µs or faster; is lightweight; is capable of operating outdoors and in extreme environments; is of compact, lightweight, modular, unitary, one-piece, and monolithic construction; is capable of forming one, two and three dimensional scanners; is versatile and rugged; and can be fabricated quickly and inexpensively, and is capable of being mass produced in large quantities.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

At least one preferred exemplary embodiment of the invention is illustrated in the accompanying drawings in which like reference numerals represent like parts throughout and in which:

FIG. 3 depicts the rear half of the panel assembly;

FIG. 4 depicts the front half of the panel assembly;

DETAILED DESCRIPTION OF THE INVENTION

I. Introduction

Figure 1:
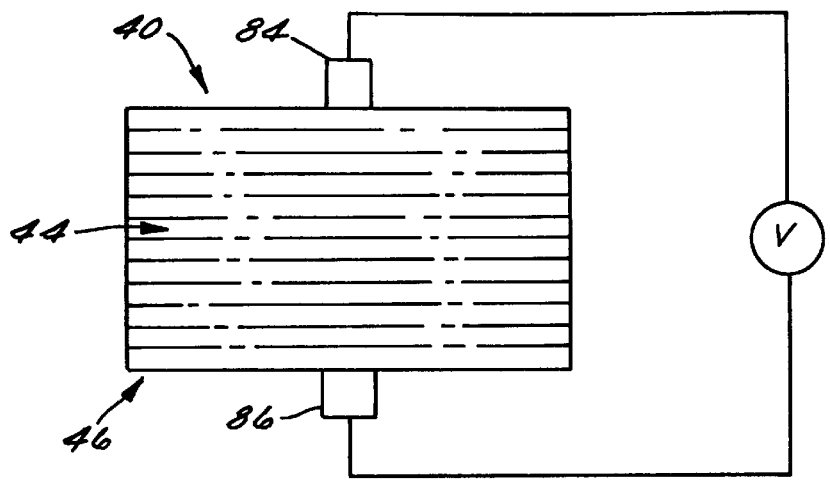
FIG. 1 illustrates a front view of a square or rectangularly shaped beam deflector of this invention.
Figure 2:
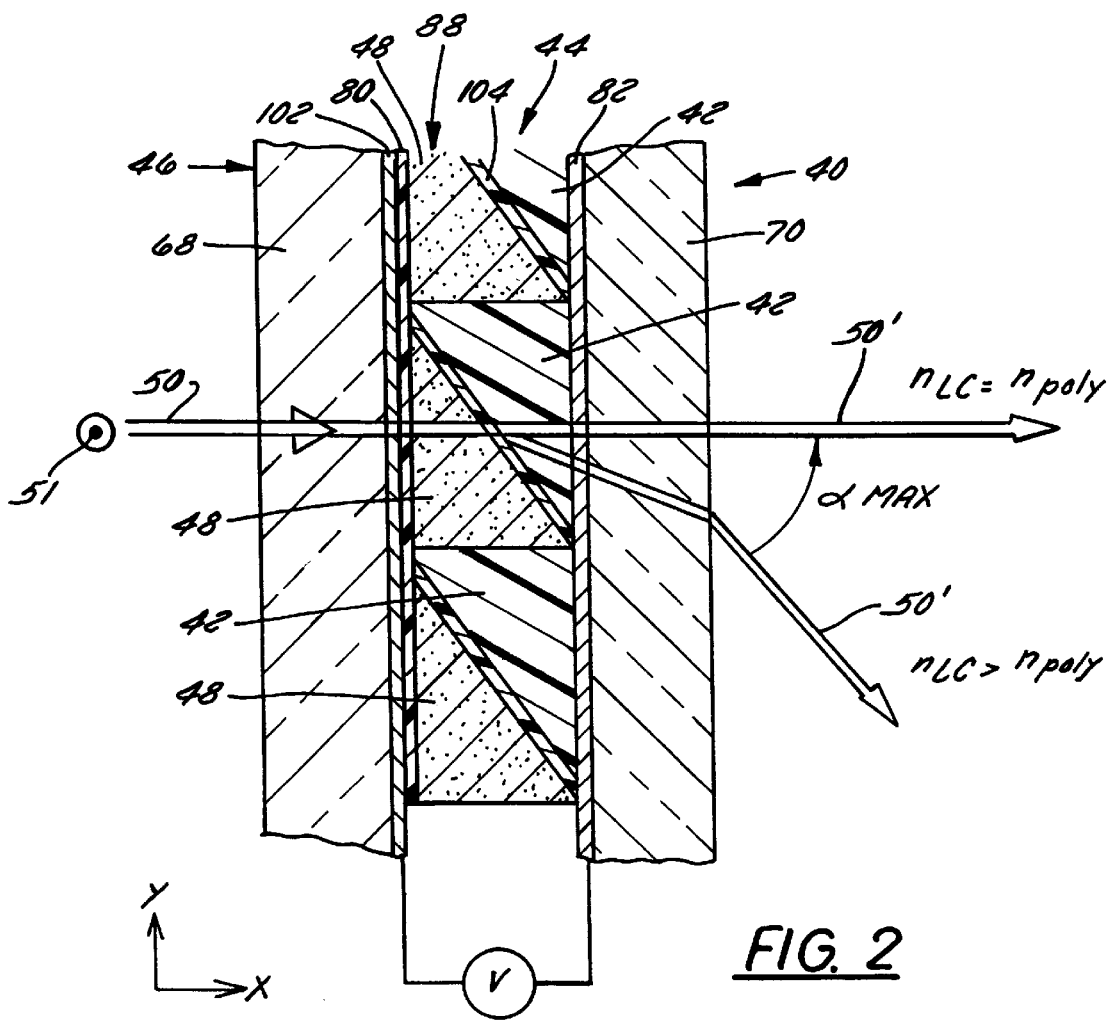
FIG. 2 depicts a side sectional view of a one-dimensional beam deflector cell or panel assembly comprised of a microprism array mated with an array of prisms of a variable refractive index material for selectively deflecting a beam of electromagnetic energy as it passes through the panel assembly.

FIGS. 1 and 2 illustrate a light beam deflector 40 of this invention that includes a plurality of pairs of prisms 42 arranged in an array 44 that preferably forms part of a cell or panel assembly 46. Referring to FIG. 2, overlying at least a portion of each of the prisms 42 is a material 48 whose refractive index, n, can be selectively changed or varied to thereby alter the deflection or scan angle, α, of a beam 50 of electromagnetic radiation, preferably light, as it passes through the panel assembly 46 in response to the controlled application of electricity to the material 48. In its preferred embodiment, the refractive-index variable material 48 is composed such that the beam 50 passing through it and at least one of the prisms 42 is deflected at an angle, α, that depends, at least in part, upon the magnitude of electric voltage applied. In its preferred embodiment, the refractive-index variable material 48 is arranged in the shape of a plurality of pairs of prisms 48 that each register with and are disposed in front of one of the prisms 42.

The beam deflector 40 of this invention is particularly well suited for applications that require the ability to quickly change the angle, α, of an incoming beam 50 such that the response time is no slower than about 100 microseconds (μs) from the time a desired electrical potential is applied until the desired angle is achieved. Preferably, the response time or switching speed of the deflector 40 is at least as fast as 45 μs or faster.

Where a single panel assembly 46 is used, each pair of prisms 42 and 48 cooperate to controllably refract an incoming beam 50 in a direction that is generally orthogonal to the panel assembly 46 such that when the outgoing beam 50' leaves the panel assembly 46, the angle of deflection, α, ranges from acute to 0° relative to the angle of the incoming beam 50. For example, referring to FIG. 2, each pair of prisms 42 and 48 refract the beam 50 in the −Y direction when the beam 50 is being controllably refracted.

So that the incoming beam 50 is generally perpendicular to the panel assembly 46 as it approaches the panel assembly 46, the beam 50 must be polarized by a polarizer, represented schematically at reference numeral 51 in FIG. 2, that is disposed optically between a source (not shown) that produces the beam 50 and the panel assembly 46. A polarizer 51 preferably is used where the beam 50 is incident on the prism 42 or 48.

The beam source preferably produces a beam 50 of electromagnetic energy. Preferably, the beam source produces a beam 50 of light that preferably falls generally within the wavelength range between about 0.3 micrometers (μm) and about 30 μm. The beam source preferably produces a beam 50 of coherent light from a source that preferably is a laser or the like. Where coherent light is focused orthogonally on the panel 46, a polarizer 51 need not be used. The beam source can also provide a beam 50 of incoherent light.

Figure 25:
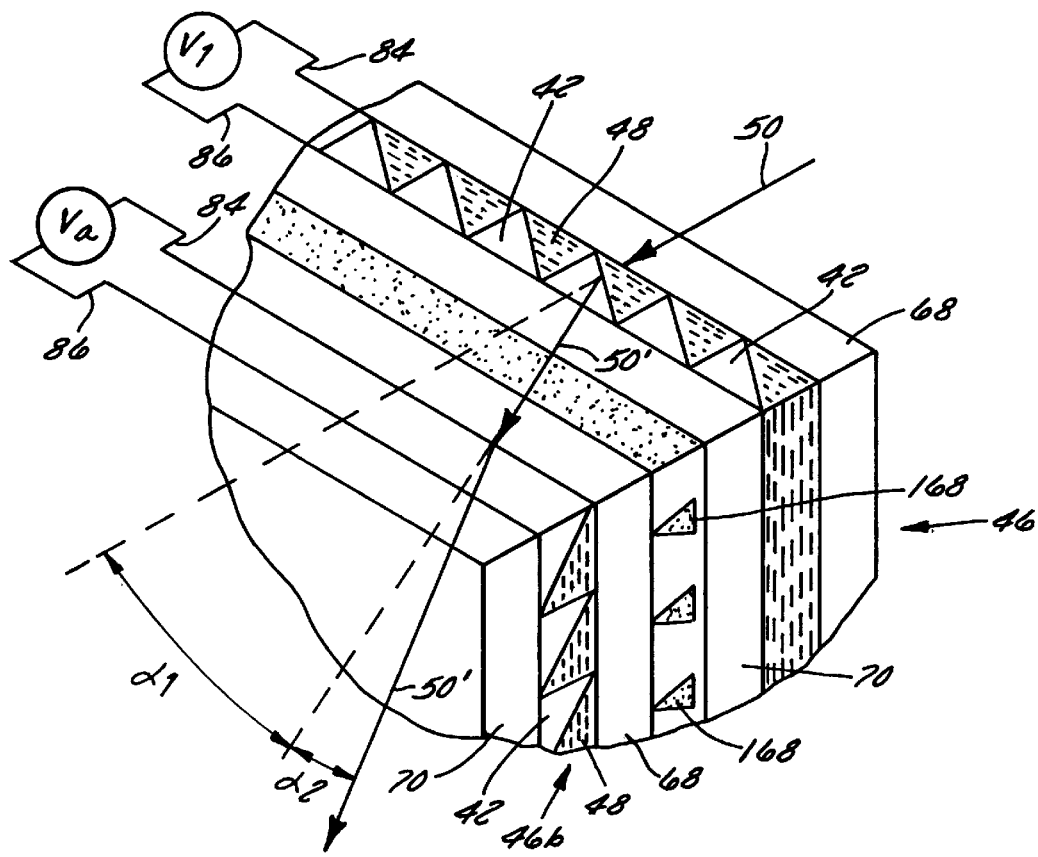
FIG. 25 illustrates a two-dimensional beam deflector comprised of a pair of crossed panel assemblies.
Figure 26:
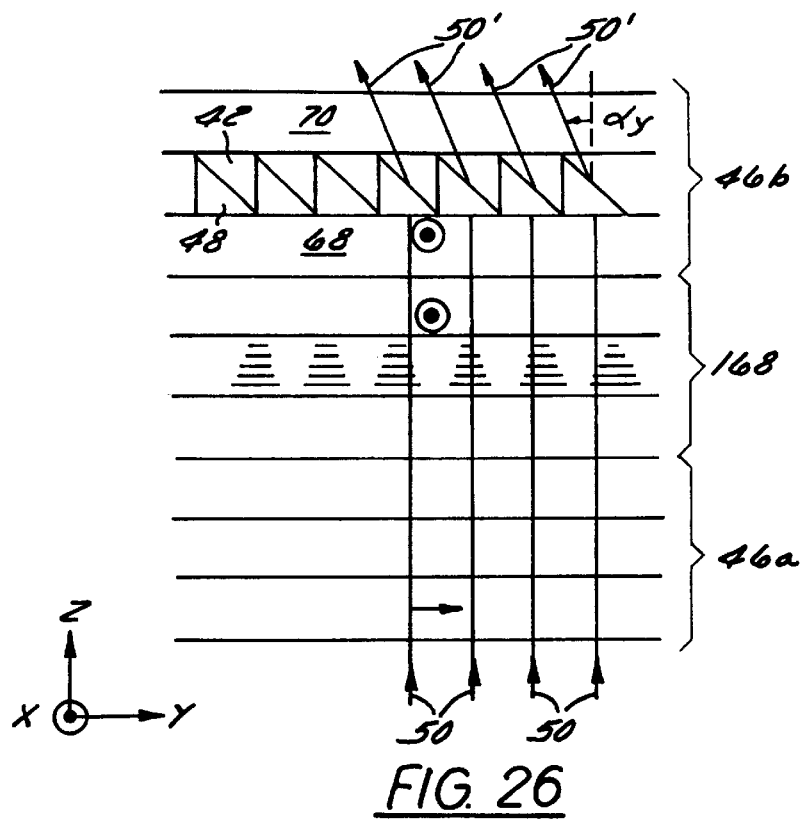
FIG. 26 illustrates operation of the two-dimensional beam deflector deflecting a plurality of pairs of beams in the Y-dimension.
Figure 27:
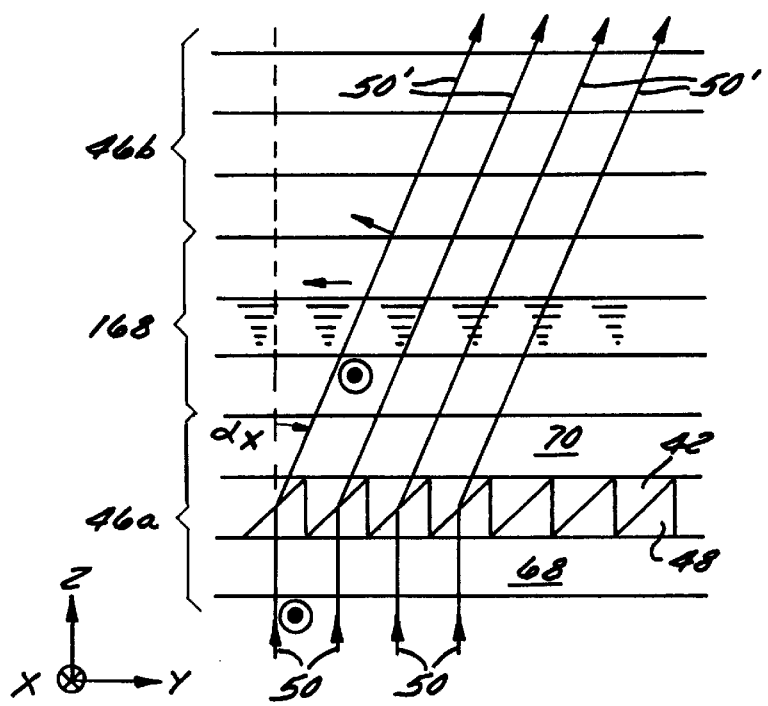
FIG. 27 depicts operation of the two-dimensional beam deflector deflecting a plurality of pairs of beams in the X-direction.

Referring to FIGS. 25–27, where two such panel assemblies 46a and 46b overlie one another, the panel assemblies 46a and 46b can form part of a two-dimensional deflector 52 that is used to selectively refract the beam 50 in two dimensions enabling the beam 50 to be used to scan an object that is disposed a distance from the deflector 52. As a result of its advantageously fast switching speed, a scanner assembly can be formed from at least one panel assembly 46 and preferably a pair of the panel assemblies 46a and 46b and is well suited for use in applications requiring high speed scanning. Examples of such applications include: range finders, displays, printers, engravers, copying machines, machine vision systems, close proximity vehicle sensing systems, environmental monitoring systems, and imaging radars such as laser imaging radars (LADARS).

II. One-Dimensional Beam Deflector

Each prism 42 preferably is a constant refractive index prism 42 that constitutes a single row of the rear array 44 and preferably extends from one side of the panel assembly 46 to its other side. A single panel deflector 40 preferably has only a single column of constant refractive index prisms 42 mated with a single column of variable refractive index prisms 48. Of course, while the prisms 42 and 48 of the panel assembly 46 shown in FIG. 1 are horizontal, they can be oriented in a direction other than horizontal.

As is shown in FIG. 2, each mated pair of prisms 42 and 48 of the panel assembly 46 have a generally rectangular cross-section. The panel assembly 46 includes a front pane 68 and a rear pane 70 that are spaced apart by the prisms 42 and 48. Referring to FIGS. 3 and 4, each pane 68 and 70 has a front surface 72 and 74, respectively, disposed toward the incoming beam 50 and a rear surface 76 and 78, respectively, disposed in a direction that faces away from the incoming beam 50. Each pane 68 and 70 preferably is constructed of a glass that preferably is transparent, but can be constructed of a suitable polymer, if desired. Examples of other suitable pane materials include quartz crystal, borosilicate glass, infrared transmissive windows, polycarbonate, acrylic, and other materials which are preferably at least somewhat transparent to the wavelength of the beam 50.

Each prism 42 preferably is comprised of a substantially constant refractive index material capable of functioning suitably as an optical prism while possessing high surface quality and good optical quality with a good transparency and a minimum of scattering loss. In one preferred prism embodiment, the prism 42 is comprised of a polymer that preferably is an epoxy. One such suitable epoxy is a type NOA 72 epoxy made or distributed by Norland Products, Inc., of North Brunswick, N.J., having, for example, the following suitable properties listed below:

TABLE 1

| | |
|---|---|
| Viscosity | 155 cps |
| Refractive Index | 1.56 |
| Hardness | Shore D 75 |
| Dielectric Constant at 1 Mhz | 3.98 |
| Dielectric Strength (V/mil) | 456 |
| Dissipation Vector at 1 Mhz | 0.0351 |
| Volume Resistivity (Ω/cm) | $7.37 \times 10^{14}$ |
| Surface Resistivity (Ω) | $3.73 \times 10^{12}$ |

Preferably, the prism material behaves as an electrical insulator and prevents flow of electrons through each constant refractive index prism 42. Other materials are also suitable. For example, another polymer, adhesive, optical adhesive, or type of epoxy can be used. Additionally, for example, glass, quartz, fused silica, infrared transmissive windows, polycarbonate, or acrylic can be used.

Referring to FIG. 3, each prism 42 of the array 44 preferably has the same cross-sectional shape. Each prism 42 has a polygonal cross-sectional shape that preferably is generally triangular. Each prism 42 has a beam-receiving face 56 that preferably is substantially planar and disposed at an angle relative to the incoming beam 50, a substantially planar beam-exiting face 58 from which the beam 50 leaves the prism 42 and which is preferably disposed substantially perpendicular relative to the incoming beam 50, and a sidewall face 60 that preferably is generally perpendicular to the beam-exiting face 58.

Each prism 42 has an apex 62 at the intersection between the beam-receiving face 56 and the sidewall face 60 that appears as a line 62 in FIG. 1. As is shown in FIG. 1, each apex line 62 is a dividing line between one prism 42 and an adjacent prism 42. Each prism also has a pair of vertices 64 and 66 that are spaced from each other and the apex 62. Vertex 64 is formed by the intersection between the beam-receiving face 56 and the beam-exiting face 58. Vertex 66 is formed by the intersection between the sidewall face 60 and the beam-exiting face 58. As is shown in FIG. 3, the lower vertex 64 of one prism 42 preferably is adjacent or abuts the upper vertex 66 of an adjacent prism 42.

Each prism 42 has an apex angle, φ, that preferably is substantially the same for all of the prisms 42 of a rear array 44. The apex angle, φ, preferably is between about 10° and about 60°. In one preferred embodiment, φ is about 57°. In another preferred embodiment, φ is about 45°. Preferably, the choice of φ is dependent upon one or more factors such as the maximum desired angle, $\alpha_{max}$, the assembly 46 can refract a beam 50 passing through, the scanning or switching speed, the size of each prism 42 and 48, and perhaps other factors. Preferably, the choice of φ is based upon routine experimentation and optimization with regard to these factors and the application in which the beam deflector 40 is being used.

The rear pane 70 forms a substrate that carries each prism 42. Preferably, the beam-exiting face 58 of each prism 42 is adhesively mounted to the front surface 74 of the pane 70. As is shown in FIG. 2, an alignment layer 80 is disposed on the front face 56 of the prism 42 and its beam-exiting face 58. The layer 80 preferably helps align the molecules of the refractive index changing material 48 along a specific direction, preferably along the length of prism 42. The layer 80 preferably is a thin layer comprised of a polyamide or polyvinyl alcohol (PVA).

Also disposed between the beam-exiting face 58 of each prism 42 and the front surface 74 of the rear pane 70 is an electrically conductive layer 82. The layer 82 preferably is comprised of a material capable of electron flow while being substantially optically transparent. Preferably, the electrically conductive material has a thickness such that light passing through it is minimally absorbed. One preferred material suitable for use is idium tin oxide (ITO).

The layer 82 is in communication with at least one electrode or terminal 84 (FIG. 1) that in turn is connected to a source of electric potential, namely a voltage source designated by V. The voltage source, V, and electrically conductive layer 82 are used to produce an electric field during operation that is used to selectively control the refractive index of one or more of the prisms 48. Preferably, about the same electric field flux or flux density is applied to all of the prisms 48 of a given array 88. Preferably, when a voltage is applied, the same voltage is applied in the vicinity of all of the prisms 48 of a given array 88.

Referring to FIG. 4, the variable refractive index prisms 48 are also arranged in an array 88 that is disposed in front of the rear array 44 and optically connected between the rear array 44 and the beam source such that a beam 50 emitted from or produced by the source will first pass through at least one of prisms 48 of the front array 88 before passing through at least one of the prisms 42 of rear array 44.

As previously discussed above, each of the prisms 48 is made of a material having a refractive index, n, that can be selectively varied to selectively control the angle at which light is refracted or deflected as it passes through the prisms 48 and 42. Preferably, each of the prisms 48 is made of a liquid crystal capable of selectively varying its refractive index, n, in response to the presence of an electric field. In the fabrication of prisms 48 made of a liquid crystal material, the rubbing directions can be parallel (π-cell), anti-parallel, or crossed.

Some suitable liquid crystal variable refractive index materials and some of their properties are listed below:

TABLE 2

| | η(mPa s)(@20° C.) | $k_{11}(\times 10^{-12}N)$ | Δn | $n_e$ | Δε |
|---|---|---|---|---|---|
| E7 | 269.0 | 11.1* | 0.2253 | 1.7460 | 13.8 |
| K15 | 58.0 | 12.0 | 0.212 | 1.7420 | 20.1 |
| ZLi1565 | 131.5 | 14.4* | 0.1317 | 1.6237 | 7.0 |
| BDH-E44 | 325.3* | 15.5 | 0.2627 | 1.7904 | 16.8 |

*the values listed in the above table are extrapolated.
where
η is the rotational viscosity of the molecules of the variable refractive index material;
$k_{11}$ is the bending elastic constant of the variable refractive index material;
Δn is the maximum change in the refractive index, n, of the variable refractive index material;
$n_e$ is the refractive index of the material when no field is applied, i.e. when the liquid crystal is in the "off" state; and
Δε is the dielectric constant of the variable refractive index material.

All of these liquid crystal variable refractive index materials are commercially available from E.M. Industries, of Hawthorne, New York.

Other suitable liquid crystal materials can also be used, provided that the molecules of the material are easy to align homogeneously and quickly respond (1) to a presence of an electric field, i.e. turn on, (2) to an absence of the electric field, i.e. turn off, and (3) to changes in the magnitude, flux, or flux density of the electric field, i.e. to quickly change α. For example, liquid crystal materials that are nematic, ferroelectric, and non-ferroelectric having the desired characteristics can be used. Preferably, a suitable material can turn on and turn off no slower than about 100 μs from the time a desired electrical potential is applied until the desired angle is achieved. Preferably, the response time or switching speed of the material is at least as fast as 45 μs or faster. If desired, a magnetic field can be used to selectively control the refractive index of the liquid crystal used in the prisms 48. For faster response times, a ferroelectric liquid crystal material preferably is used.

Referring to Table 2 above, where the variable refractive index material is a liquid crystal material, the ability of the liquid crystal material to respond to the presence of an electric or magnetic field is measured by its rise time, $T_r$, and the ability of the liquid crystal material to respond to the absence of an electric or magnetic field is measured by its relaxation time, $T_d$. Thus, the molecules of the selected liquid crystal material of each prism 48 must easily align homogeneously in the off state where no electric or magnetic field is applied. Additionally, the liquid crystal material must be well defined in terms of its molecular orientation or alignment. Rise time, $T_r$, and relaxation time, $T_d$, can be expressed using the following equations:

$$T_r = C_1 \frac{\eta d^2}{\epsilon_o \Delta \epsilon V^2}$$

$$T_d = C_2 \cdot \frac{\eta d^2}{k_{11} \pi}$$

where
$C_1$ and $C_2$ are constants dependent upon the specific type of liquid crystal material;

d is the thickness of the liquid crystal cell, i.e. thickness of prism 48;

From the relationships evident in the above two equations, it is clear that $T_r$ and $T_d$ are proportional to $\eta$ and to $d^2$, and that $T_r$ decreases with $\Delta\epsilon$, while $T_d$ decreases with $k_{11}$. Therefore, it is preferred, and even critical to achieving the desirably fast response times and switching speeds cited herein, to select liquid crystal materials having a low $\eta$, a high $\Delta\epsilon$, and a high $k_{11}$, while making the cross-sectional thickness of the mated arrays 44 and 88 as thin as possible. Preferably, for a liquid crystal material to be suitable, $\eta$ is no greater than about 300 mPa.s, $\Delta\epsilon$ is no less than about 20, and $k_{11}$ is no less than about $10\times10^{-12}$ N.

Each prism 48 of the array 88 preferably has a substantially common cross-sectional shape that preferably is generally triangular. Each prism 48 has a beam-receiving face 90 that preferably is disposed substantially perpendicular or orthogonal to the direction of the incoming beam 50. The beam-exiting face 92 is disposed at an angle acute relative to the beam-receiving face 90 and is disposed at an angle relative to the direction of the incoming beam 50. The sidewall face 94 is generally parallel to the direction of the incoming beam 50.

Each prism 48 has an apex 96 formed by the intersection between the sidewall face 94 and the beam-exiting face 92. The intersection between the beam-receiving face 90 and the beam-exiting face 92 form another vertex 98 and the intersection between the beam-receiving face 90 and the sidewall face 94 form a still further vertex 100.

The front pane 68 forms a substrate that carries each of the prisms 48. Preferably, the beam-receiving surface of each prism 48 is mounted to the rear surface 76 of the pane 68. As is also shown in FIG. 2, there is an electrically conductive layer 102 disposed between the beam-receiving face 90 of each prism 48 and the rear surface 76 of the pane 68. Preferably, the layer 102 is the same as or substantially the same as layer 82. The layer 102 is electrically connected to electrode or terminal 86 (FIG. 1) that, in turn, is electrically connected to the voltage source, V.

Referring to FIGS. 2–4, when the two arrays 44 and 88 are assembled together, there preferably is an alignment layer 104 disposed between the beam-exiting face 92 of each prism 48 and the beam-receiving face 56 of each prism 42. Layer 104 preferably is the same or substantially the same as layer 80.

Figure 5:
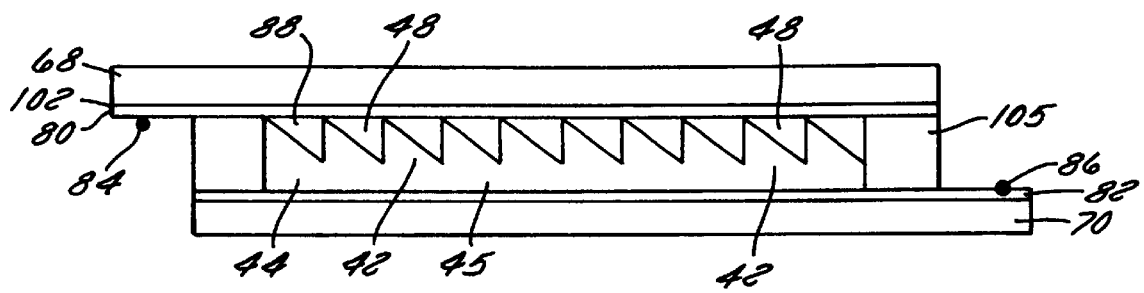
FIG. 5 illustrates a cross sectional view of one preferred beam deflector panel assembly.

FIG. 5 depicts another preferred panel configuration. FIG. 5 is similar to FIG. 2 except that there is a spacer 105 between each pane 68 and 70. The spacer 105 preferably is disposed about the periphery of the arrays of prisms 42 and 48 and preferably is made of a resilient film, such as DuPont MYLAR film or the like. As is also shown in FIG. 5, the prisms 42 of array 44 extend upwardly from a base section 45. Additionally, in FIG. 5, the alignment layer 80 is disposed in front of prism array 88 instead of behind it.

Figure 6:
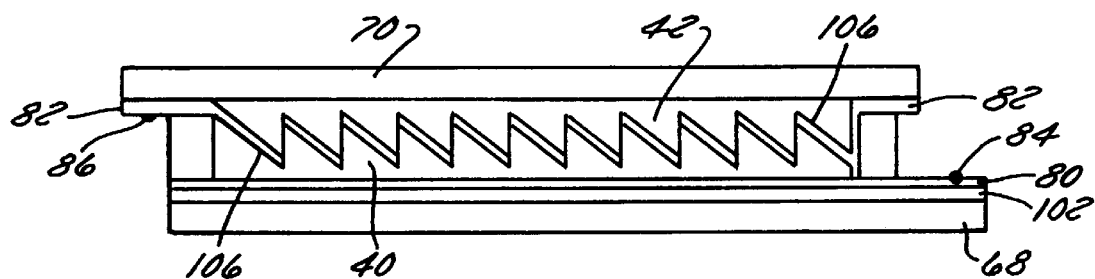
FIG. 6 illustrates a cross sectional view of another preferred beam deflector panel assembly.

FIG. 6 depicts still another preferred panel configuration. As shown in FIG. 6, there can be another electrically conductive layer 106 disposed between each adjacent pair of prisms 42 and 48. The layer 106, also shown in phantom in FIG. 3, is coated on the beam-receiving face 56 of prism 42 instead of layer 82 between faces 58 and 74. Such a layer 106 preferably helps preserve the profile of the beam 50 by preventing convergence or divergence of the beam 50 as it passes through the panel 46 by creating a non-uniform field across the adjacent variable refractive index prism 48. Such a layer 106 preferably is made of ITO and preferably also causes the birefringence, An, to be more uniform across the entire array 88 of prisms 48.

Providing a layer 106 of conductive material on the face 56 of each prism 42 also increases the maximum deflection angle, $\alpha_{max}$, over the panels shown in FIGS. 2 and 5. This is because the electric field is stronger near the tip 98 (FIG. 4) of each prism 48 than near its base 94 causing the effective refractive index change of each prism 48 to be larger adjacent the base 94 than adjacent the tip 98. As a result, the effective apex angle of each prism 48 is increased, i.e. the optical path is increased, such that it behaves as if its apex angle, $\phi$, is larger than what it really is, thereby producing a larger maximum deflection angle, $\alpha_{max}$ for a given apex angle, $\sigma$, as compared to the panels shown in FIGS. 2 and 5. Preferably, $\sigma$ and $\phi$ are substantially the same.

When the two arrays 44 and 88 are assembled together, each prism 48 of the front array 88 is received in a complementary void of generally triangular cross-section that is located immediately in front of each prism 42. Preferably, the alignment layer 104 disposed between them also helps keep them together. As such, the alignment layer 104 preferably serves as an adhesive that joins the beam-exiting face 92 of each prism 48 to the beam-receiving face 56 of the prism 42 adjacent to and facing the particular prism 48. When assembled together, the mated arrays 44 and 88 form a prismatic assembly that has a generally rectangular cross-section.

To increase response and switching speed, each of the prisms 42 and 48 are relatively small. Each of the prisms 42 and 48 have a pitch, p, that represents the height, depth or thickness of the prism. Each of the prisms 42 and 48 have a height, p, of no greater than about 20 $\mu$m such that they are each microprisms. As the speed with which a liquid crystal prism 48 turns off, that is, returns to its off refractive index, $n_c$, decreases with increasing thickness, it is desirable to minimize the thickness of each prism 48 and 42. To achieve a desirably fast response time of less than about 100 $\mu$s, each of the prisms 42 and 48 has a height, p, that is no greater than about 20 $\mu$m. Preferably, the height, p, of each prism is less than about 15 $\mu$m and is about 10 $\mu$m or less to even further decrease response time. To still further decrease turn-off time where the prisms 48 are made of a liquid crystal variable refractive index material, rubbing is performed in the parallel direction during fabrication to form a panel assembly 46 that is of $\pi$-cell construction when fabrication is complete.

The height, p, of each prism 42 preferably is substantially the same for all of the prisms 42 of the array 44. Likewise, the height, p, of each prism 48 preferably is substantially the same for all of the prisms 48 of the array 88. While the height, p, of each prism 42 can differ from the height, p, of each prism 48, they preferably are about the same. As each prism 42 and 48 preferably has a right-triangular cross-section, the height, p, of both prisms 42 and 48 preferably is the same as the length of the sidewall faces 60 and 94 of the prisms 42 and 48.

The width, w, of each prism 42 and 48 preferably is no greater than about 100 $\mu$m. In one preferred embodiment, the prism width, w, is about 30 $\mu$m and can be narrower, if desired.

The voltage source, V, is a variable voltage source that is capable of varying the voltage applied to terminals 84 and 86 in a manner that changes the refractive index, n, of each of the variable refractive index prisms 48. Preferably, the voltage source, V, is an alternating current source that preferably outputs a square wave. Preferably, the voltage applied to the terminals 84 and 86 can be selectively varied between 0 and 10 volts. Depending upon prism thickness, the voltage can be higher. For example, for prism thicknesses greater than about 20 μm, the voltage can be higher than 10 volts.

The voltage source, V, can be connected to other circuitry, analog or digital, that is used to selectively control how much voltage the source, V, provides to each terminal. For example, digital circuitry can be used along with a computer program to control how much voltage is applied to accurately control the angle at which the beam 50 is refracted. Such a computer program can access a lookup table or a function, such as an equation, that correlates a plurality of refractive indexes of prism 48 with the voltage needed to produce the desired refractive index.

Figure 7:
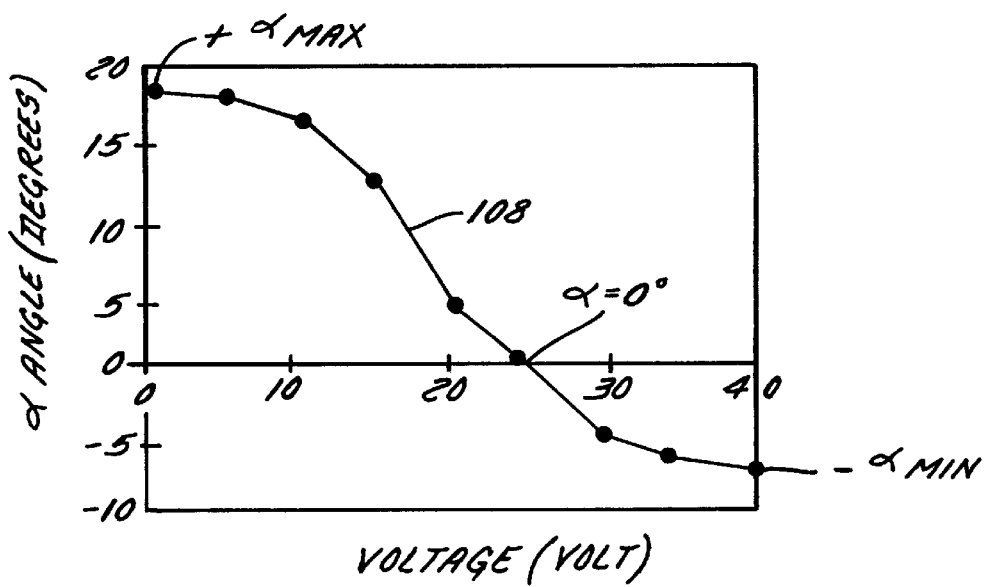
FIG. 7 is a graph showing the angle of deflection of a beam passing through a panel assembly relative to the voltage applied to the panel assembly.

Such a lookup table or equation can be derived based upon routine experimentation of the refractive index achieved for a given applied voltage by applying the voltage and measuring the angle of refraction of the beam 50 as it passes through the panel 46. FIG. 7 illustrates an example of such data developed for a polymer microprism array beam deflector 40 having prisms 48, each with a length of 25 μm and a height of 30 μm, made of E7 nematic liquid crystal arranged in a panel 46 of about 2 inches by 2 inches aperture size. As is shown by the plot 108 in FIG. 7, the beam deflection angle maximum, $\alpha_{max}$, is about 20° and the minimum deflection angle, $\alpha_{min}$, is about −8°. With no voltage applied, α is about 20°. As is shown by the parabolic plot 108, as the voltage is selectively varied between 0 volts and about 25 volts, α correspondingly selectively varies between slightly less than 20° and about 0°. Thus, for the panel assembly 46 shown in FIG. 1, when constructed in accordance with the above specifications, α ranges from an $\alpha_{max}$ of slightly less than about 20° to a preferred minimum a that is limited to be no greater than about 0°.

Figure 8:
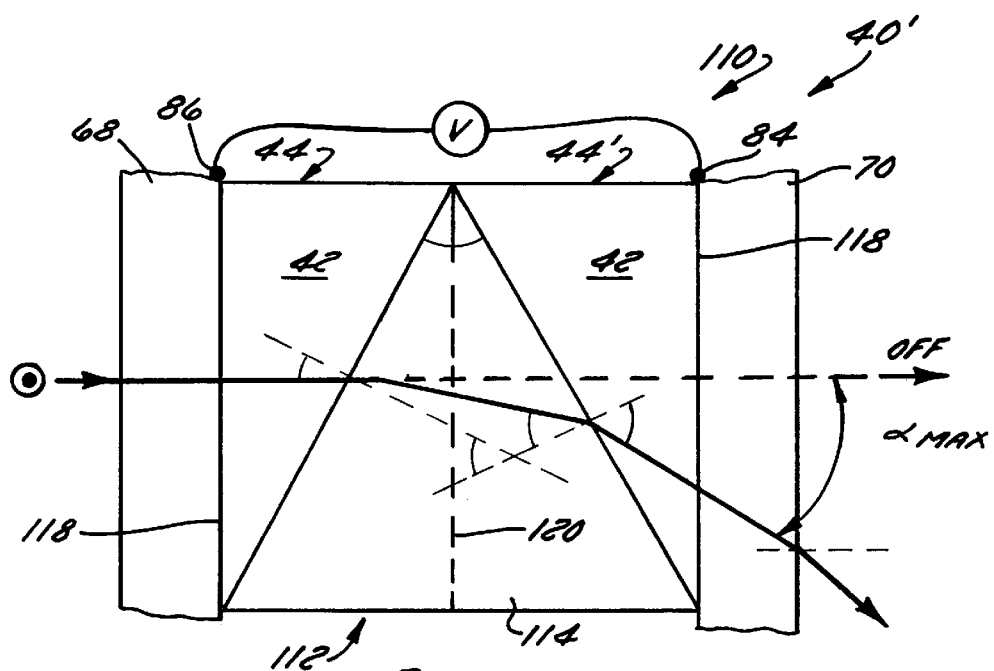
FIG. 8 is a cross sectional view of still another preferred beam deflector panel assembly.

FIG. 8 depicts a portion of a second preferred panel assembly 110 of a second preferred embodiment of the beam deflector 40'. The panel assembly 110 has a pair of outer arrays 44 and 44' of prisms 42 and a middle array 112 of variable refractive index prisms 114 that each have a cross-section of a triangle that can be an equilateral or isosceles triangle. Each prism 114 can be made up of a pair of the prisms 48 mated together at the phantom line designated by reference numeral 120. Array 44' is the same as array 44 except that it is mirrored about line 120. If desired, the panel assembly 110 can be constructed of a first pair of arrays 44 and 88 together and a second pair of arrays 88 and 44 mated together resulting in a double microprism array assembly. Disposed between the front pane 68 and the front prism array 44 is a conductive layer 118 and disposed between the rear pane 70 and the rear prism array 44' is another conductive layer 118. The panel assembly 110 produces a maximum deflection angle, $\alpha_{max}$, that is much greater than for panel assembly 46. Typically, the $\alpha_{max}$ of panel assembly 110 is greater than about double that of panel assembly 46.

Where temperature considerations are important, such as when the beam deflector 40 or 40' is used outdoors in temperatures less than about 60° Celsius (C.), a temperature compensation can be used. For military and avionics applications, where temperatures can widely vary, temperature compensation of some sort preferably is used. Where the temperature of the environment is about 60° C. or above, temperature compensation is likely not needed. When used indoors where the temperature is constant, temperature compensation may not be needed.

Figure 9:
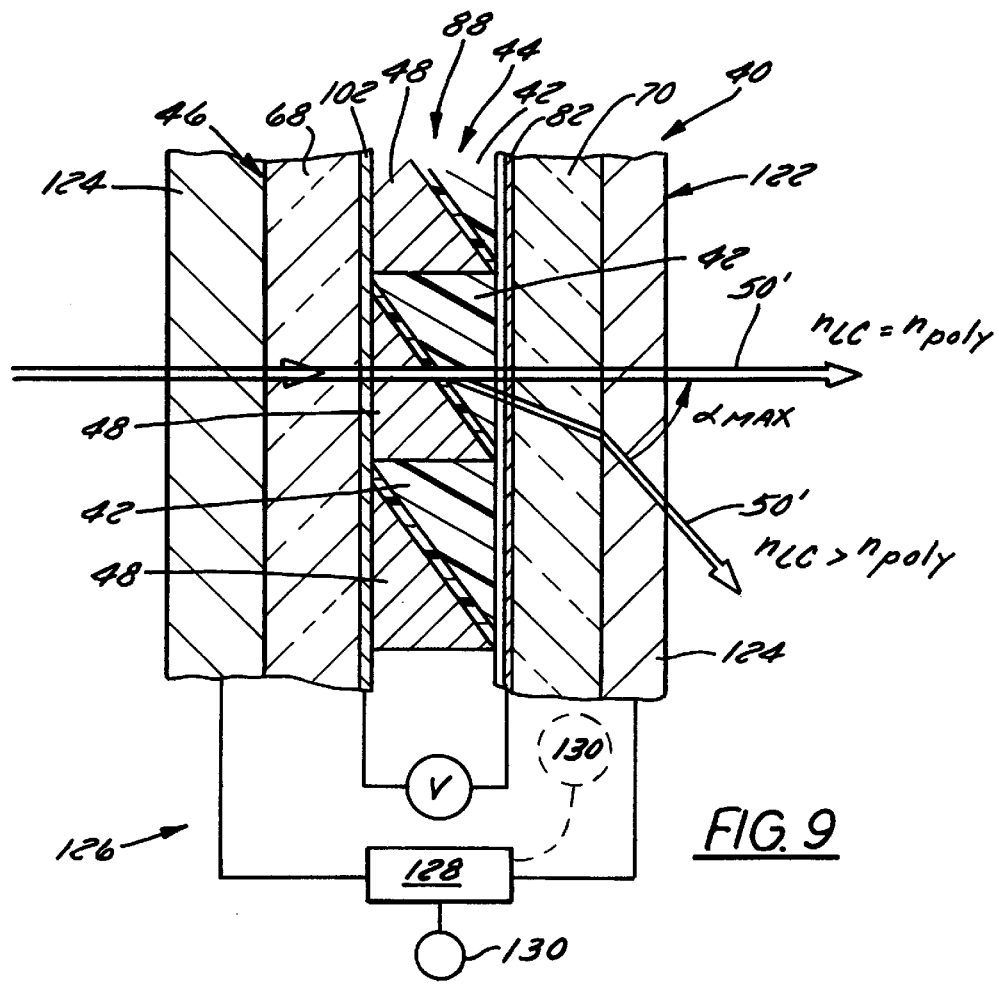
FIG. 9 illustrates one preferred arrangement for compensating for the temperature of the panel assembly.

Referring to FIG. 9, the beam deflector 40 includes a temperature compensator 122 constructed so as to help keep the array 88 of refractive index prisms 48 at a relatively constant temperature and at a temperature at which response time of the deflector 40 is not undesirably slowed. The compensator 122 includes a thermoelectric heater 124 in contact with the panel assembly 46 to heat the panel assembly 46. Preferably, the thermoelectric heater 124 comprises a thermal jacket that preferably encapsulates substantially the entire panel assembly 46.

The heater 124 is controlled by circuitry 126 that preferably comprises a controller 128 in communication with a sensor 130 that senses the temperature of the environment surrounding the panel assembly 46. The controller 128 can be, for example, a programmable controller, and the sensor 130 can be, for example, a thermocouple, a thermistor, or the like. Electric power is supplied to the circuitry 126 from a source that can be the voltage source, V.

Preferably, the controller 128 is provided a signal from the sensor 130 that is representative of the surrounding temperature and regulates current flow accordingly to the heater 124 to help keep the temperature of the panel assembly 46 relatively constant at a desirable temperature. If desired, another temperature sensor in communication with the panel assembly 46 can provide feedback to the controller 128 as to the actual temperature of the panel assembly 46. Such feedback can also be used to regulate current flow to the heater 124.

In another preferred compensator scheme, the controller 128 can regulate the voltage applied to the terminals 84 and 86 of FIG. 8 in response to the sensed surrounding temperature as well as the sensed temperature of the panel assembly. A lookup table can be used to regulate the voltage in response to the sensed temperature.

Figure 10:
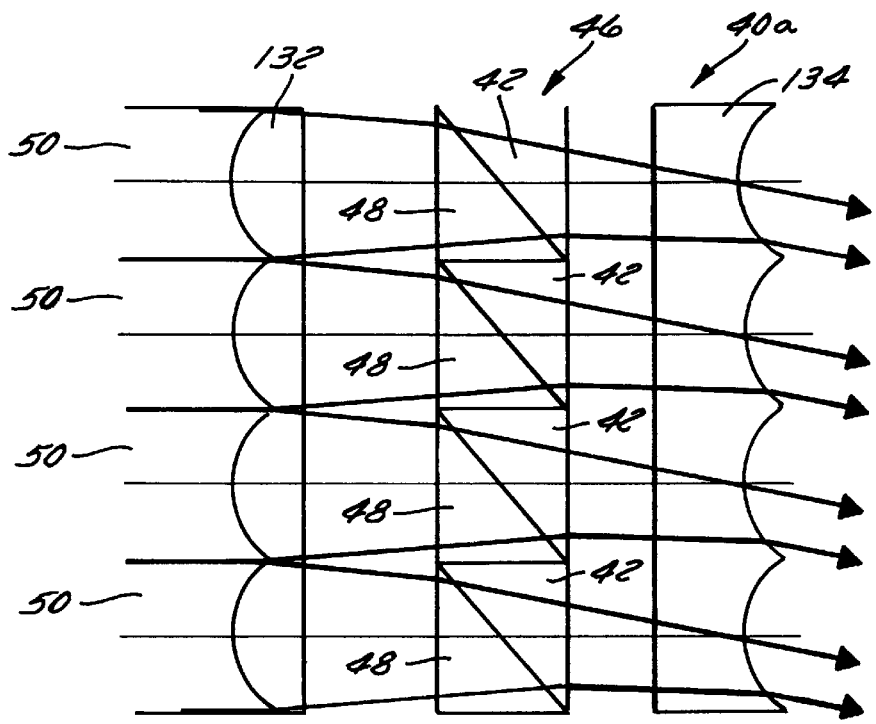
FIG. 10 depicts use of a pair of microlens arrays to reduce or prevent diffraction noise resulting from a beam passing through the beam deflector.

FIG. 10 illustrates another preferred embodiment of the beam deflector 40a that is used to reduce beam diffraction noise during operation of the deflector 40a. To lessen diffraction noise, the deflector 40a utilizes a positive microlens array 132 that is disposed between the source of each beam 50 and the panel 46 and a negative microlens array 134 that is disposed behind the panel 46. The positive microlens array 132 comprises a plurality of pairs of adjacent convex lenses arranged in to form the array 132 shown in FIG. 11. The negative microlens array 132 comprises a plurality of pairs of adjacent concave lenses arranged to form the array 134 shown in FIG. 10. The positive microlens array 132 reduces diffraction noise by focusing each beam 50 so it avoids the corners of prism 42 and the negative microlens 134 collimates or spreads the beam 50 out after it has passed through the panel 46.

Figure 11:
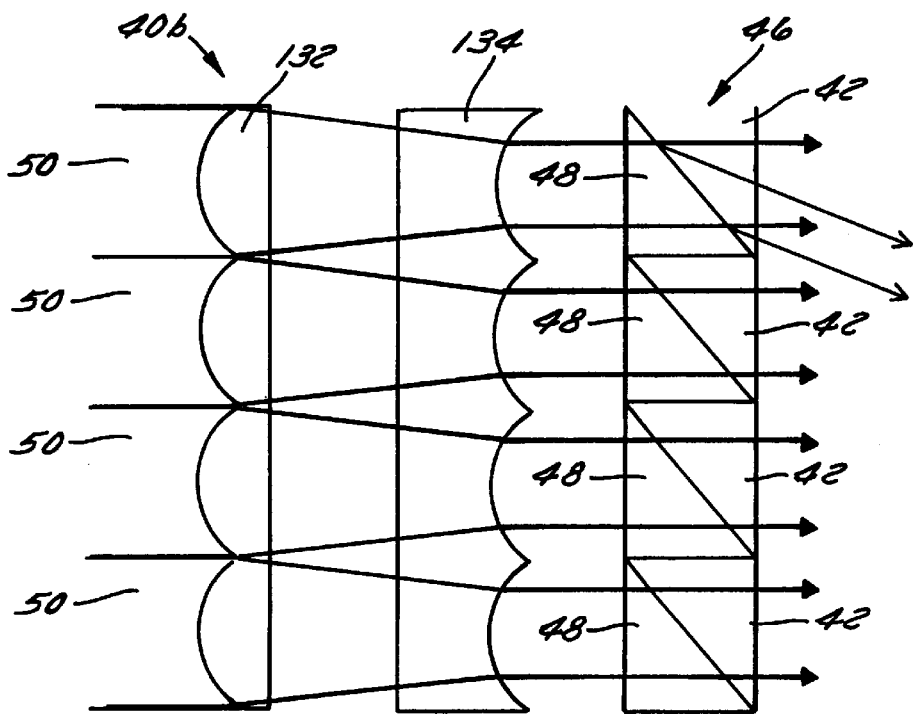
FIG. 11 depicts a second preferred arrangement of the microlens arrays for reducing or preventing beam diffraction noise.

FIG. 11 illustrates still another preferred embodiment of the beam deflector 40b where the negative microlens array 134 is located between the positive microlens array 132 and the panel 46. This deflector 40b also advantageously reduces diffraction noise. Preferably, the beam deflectors 40a and 40b are of microaperture liquid crystal microprism array construction.

Figure 12:
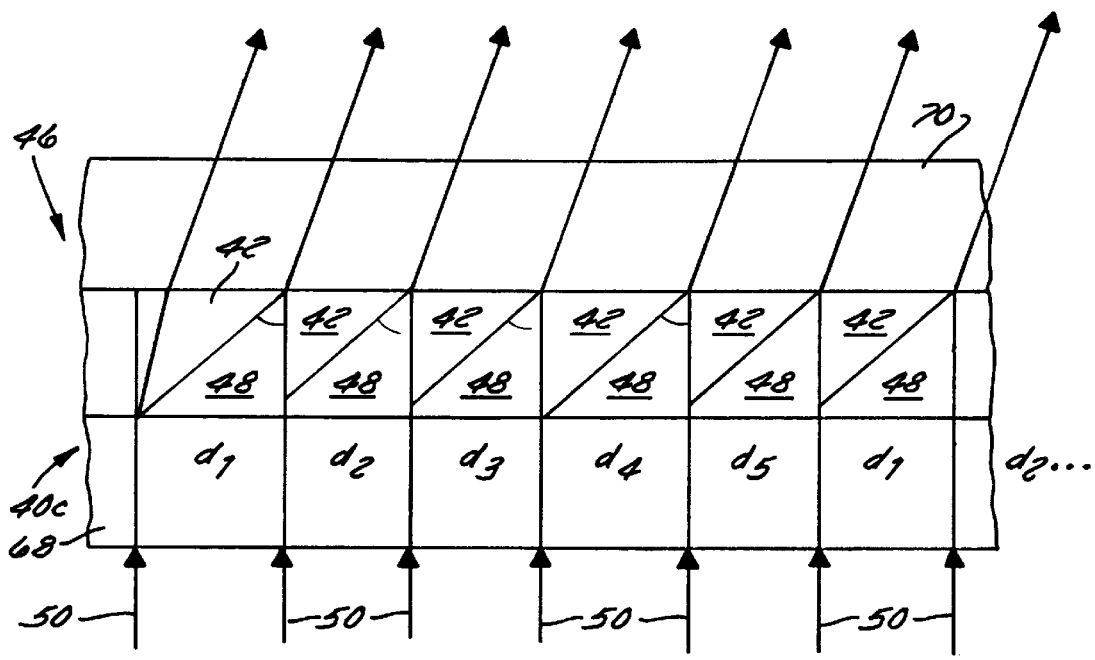
FIG. 12 depicts a preferred beam deflector panel assembly where the widths of sets of prisms differ in a repeating aperiodic arrangement to reduce or preferably virtually eliminate beam diffraction noise.

FIG. 12 illustrates a still further preferred embodiment of the beam deflector 40c that also reduces diffraction noise. The beam deflector 40c is an aperiodic liquid crystal microprism array that has prisms 42 that each have the same pitch but each have a different width, $d_1$, $d_2$, $d_3$, $d_4$, and $d_5$. Preferably, the sequence of prism widths is repeated throughout the array 44. The sum of the prism widths, $d_1+d_2+d_3+d_4+d_5$, is larger, preferably much larger, than the wavelength of the beam 50. Preferably, the sum of the prism widths is at least about 100 times the wavelength of the beam 50. As a result of this construction, diffraction is almost negligible.

Figure 13:
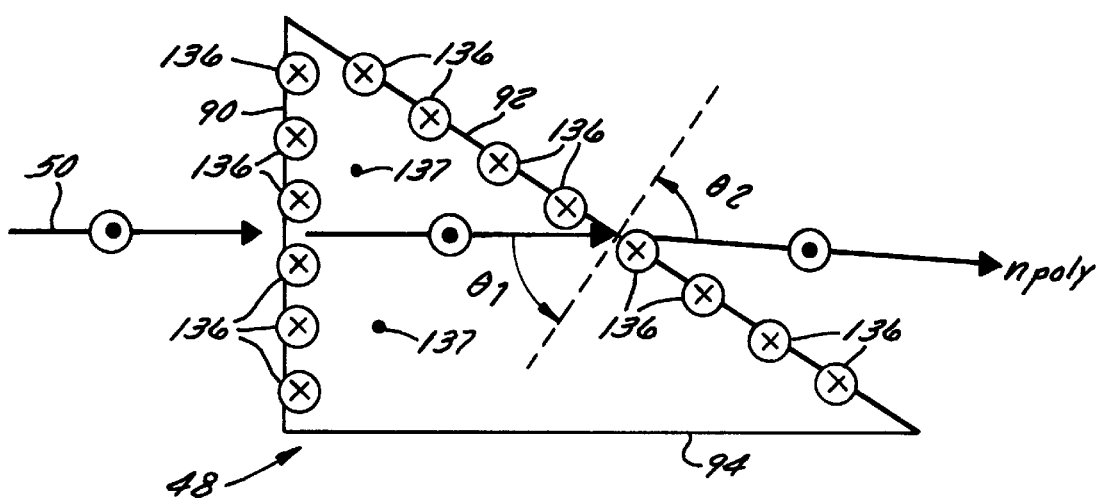
FIG. 13 depicts operation of a single prism of variable refractive index material in the presence and absence of an electric or magnetic field provided by a voltage selectively applied to the prism.

Referring to FIGS. 1, 2 and 13, in operation, when no electricity is applied to the terminals 84 and 86 the refractive index, $n_{lc}$, of each the variable refractive index prism 48 is greater than the refractive index, $n_{poly}$, of its adjacent prism 42, the beam 50 is deflected in the manner shown in FIG. 2 such that the outgoing beam 50' leaving the panel 46 is disposed at an acute angle, α, relative to the incoming beam 50. As is shown in FIG. 2, the difference between $n_{lc}$ and $n_{poly}$ is the greatest when the electricity is off and the angle the beam 50 is deflected, α, is at a maximum, $α_{max}$. To achieve an $α_{max}$ of at least about 30°, the electricity-off difference between $n_{lc}$ and $n_{poly}$ is at least about 0.15 and preferably at least about 0.2.

When electricity is applied to the terminals 84 and 86, the refractive index, $n_{lc}$, of prism 48 lessens causing the angle of deflection, α, also to lessen. When electricity is applied to terminals 84 and 86, electricity is provided to each conductive layer 82 and 102 giving rise to an electric field that extends between the layers 82 and 102 and through each of the prisms 48. As the magnitude of electricity, i.e. voltage, is increased, the angle of deflection, α, decreases until it approaches or reaches 0°, as is shown in FIG. 2. When the applied voltage is increased, $n_{lc}$ decreases until it approaches or is substantially equal to $n_{poly}$. When $n_{lc} \approx n_{poly}$, $α \approx 0°$ and the beam 50 preferably passes substantially straight through the panel 46 without being deflected. In one preferred embodiment, α is 0° when $n_{lc} \approx n_{poly} \approx 1.5$. Referring to FIG. 7, if the voltage is further increased beyond the value at which α is 0°, the beam 50 can actually be deflected in an opposite direction such that the value of the deflection angle, α, is negative. By selectively controlling how much voltage is applied to the terminals 84 and 86 of the panel 46, the angle of deflection, α, of the beam 50 as it passes through the panel 46 can be precisely controlled, preferably within about 0.5 milliradians. More specifically, the angle of deflection, α, of the beam 50 can be controlled by controller circuitry to precisely apply voltage to terminals 84 an 86 so as to deflect the beam 50 within about 0.5 milliradians of the desired angle of deflection. Preferably, voltage can also selectively be applied so as to be able to deflect the beam 50 in angular increments as small as about 0.5 milliradians.

FIG. 13 illustrates the alignment of molecules 136 of the variable refractive index material when no voltage is applied to prism 48. Further depicted in FIG. 13 is a light beam 50, polarized in the direction perpendicular to the paper plane, striking the front face 90 of the variable refractive index prism 48 on which molecules 136 of the variable refractive index material at the face 90 are aligned generally parallel to the light polarization. The molecules 136 at the face 92 which forms part of the interface between the adjacent pair of prisms 42 and 44 as well as the molecules (not shown) within the prism 48 between the faces 90 and 92, are also aligned in the same direction. Incident light then experiences an optic refractive index, $n_{lc}$, in the variable refractive index prism 48. Light passing through the panel 46 is deflected according to Snell's law:

$$n_{lc}*\sin θ_1 = n_{poly}*\sin θ_2$$

However, when a voltage that is greater than a threshold voltage, $V_{th}$, of about 1–2 volts is applied across a pair of adjacent prisms 42 and 48, the molecules of prism 48 align generally along the direction of the electric field that is produced between the conductive layers on each side of prism 48, typically layers 82 and 102. Only a thin layer of molecules 136 on faces 90 and 92 does not reorient in a direction along the electric field. In FIG. 13, the direction of the flux lines 137 of the electric field are generally perpendicular to the plane of the paper. That is, the flux lines 137 extend out of the paper and parallel to the lengthwise direction of the prism 48. The molecules 136 typically remain oriented in the direction of rubbing during fabrication. However, this thin layer of molecules 136 has a negligible effect on the light beam 50 as it passes through the prisms 42 and 48 that can generally be ignored.

When a relatively high voltage that is higher than $V_{th}$ is applied, a refractive index of $n_{lco}$ results that produces a deflection angle, $θ_2$ at the interface between prism 48 and prism 42 that satisfies the following equation:

$$n_{lco}*\sin θ_1 = n_{poly}*\sin θ_2$$

Where the applied voltage is between 0 volts and the saturation voltage, $V_{sat}$, for the prisms 42 and 48, the refractive index, $n_{lc}$, depends on the orientation of molecules of the variable refractive index material and the direction of light polarization such that:

$$n = n\left(\hat{\vec{E}}, \hat{n}\right)$$

where $\hat{\vec{E}}$ (electric field direction) is the polarization direction of the light beam 50 and $\hat{n}$ (molecular orientation) is the variable refractive index material director. Since the director is a function of position, the refractive index varies from point-to-point. Even at a given point, the index varies with the direction of light beam polarization. The effective refractive index, $n_{eff}$, can be expressed as: where β is the angle between the electric field direction and the molecular field orientation.

$$n_{eff} = \frac{n_e n_o}{\sqrt{n_e^2 \sin^2 β + n_o^2 \cos^2 β}}$$

III. Fabrication Method

In the fabrication of a panel assembly or cell 46, the panel assembly 46 consists of a front substrate 68, a layer 88 of material 48 possessing a variable refractive index that can be selectively varied, an array 44 or prisms 42 comprised of a material that preferably has a substantially constant refractive index, and a rear substrate 70. In fabricating the panel assembly 46 shown in FIG. 2, the rear substrate 70 is coated with the conductive layer 82 and the array 44 or prisms 42, preferably microprisms 42, is embossed on top of the layer 82 and substrate 70. With the spacer 105 placed between the two substrates 68 and 70, the substrates 68 and 70 are brought together and variable refractive index material is introduced between the substrates 68 and 70 to fill the voids created between the array 44 and top substrate 70. When the voids are filled with variable refractive index material, fabrication of the cell or panel assembly 46 is completed.

Figure 14:
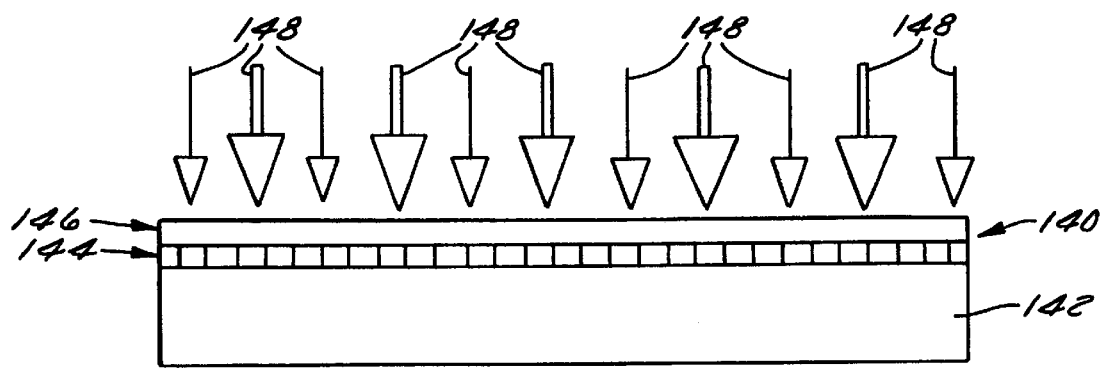
FIG. 14 illustrates a first step in making a master that is later used either to replicate microprism arrays or to fabricate masters used to replicate microprism arrays.
Figure 15:
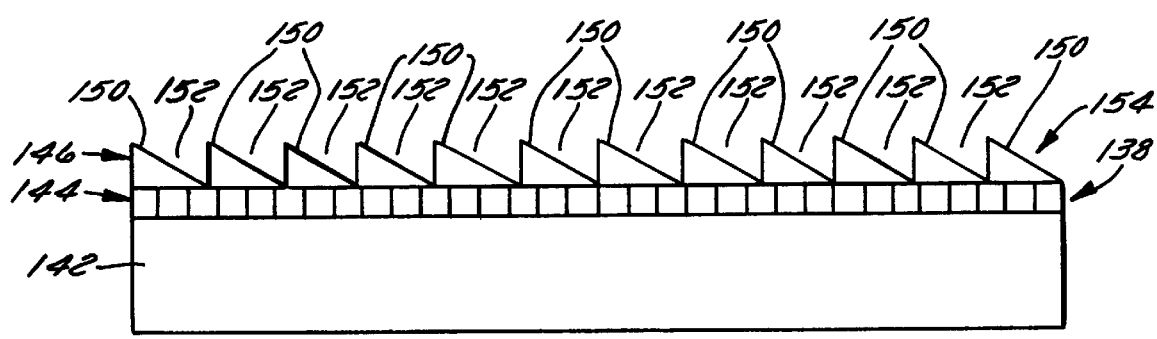
FIG. 15 illustrates a second step in making the master after application of light has etched a light sensitive material carried by a substrate to form ridges and valleys substantially complementary to the shape of the desired microprism array.

Referring to FIGS. 14 and 15, so that panel assemblies 46 can be mass produced, a master 138 preferably is constructed for use in embossing the prisms 42 onto substrate 70. FIG. 14 depicts a blank 140 that is to be made into the master 138 shown in FIG. 15. The blank 140 consists of a substrate 142 that carries an intermediate layer 144 and an energy beam resist layer 146.

The substrate preferably is comprised of a glass, such as quartz glass, silica, borosilicate, or the like. The intermediate layer 144 preferably is made of ITO, chrome or another suitable reflective material. The beam resist layer 146 is constructed of a material that can be etched using a beam 148 of energy that preferably is an electron beam, an ion beam, or another beam that possesses a suitably high energy density that it can vaporize or otherwise selectively remove a portion of layer 146 upon impingement.

Preferably, the layer 146 is made of ion beam resist, such as polymethyl methacrylate (PMMA), so that one or more beams 148 produced by an emitter (not shown) during direct-write electron beam lithography can impinge against the layer 146 to create the desired master three-dimensional relief pattern 154. Preferably, the intensity or duration of exposure of the layer 146 to the beam or beams 148 determines how deeply each portion of the layer 146 is etched.

In fabricating the master 138, as is shown in FIG. 14, the blank 140 is irradiated with at least one beam 148 and preferably a plurality of pairs of beams 148 that each etch away a portion of layer 146. When irradiation is finished, as is shown in FIG. 15, the etching produces a relief pattern 154 that comprises a plurality of pairs of upstanding and generally triangular ridges 150 that define generally triangular furrows or voids 152 between adjacent ridges 150 which are complementary to the prisms 42 of array 44 desired to be formed therein.

In another preferred similar fabrication method, the blank 140 preferably is completely comprised of a glass that preferably is of quartz composition. An ion-beam mills the desired three-dimensional relief pattern 154 into the glass blank which thereafter serves as the master 138. Preferably, such a master can be used to mass produce copies of the prism array 44, preferably along with substrate 70, using high optical grade injection molding or by using a photopolymer.

The master 138 shown in FIG. 15 can actually comprise a submaster that is stitched or otherwise joined together with others to create a much larger master. For example, where the submaster 138 has dimensions of 1 centimeter (cm) by 1 cm, several submasters 138 can be stitched or joined together along one or more edges to create an array of submasters that forms a much larger master that can be as large as 7.5 cm by 7.5 cm or even larger. Where stitching or the like is used to join submasters together, any resultant discontinuities where the submasters 138 are joined are preferably no greater than about 0.1 μm.

In this manner, a larger master can be produced for making panel assemblies 46 that are relatively large. For example, while panel assemblies 46 that are 1 cm by 1 cm may be suitable for some applications, panel assemblies that are 3 cm by 3 cm may be suitable for other applications, and panel assemblies that are 7.5 cm by 7.5 cm may be suitable for still other applications. If desired, masters used to replicate the panel assemblies can be generally rectangularly shaped as shown, generally circularly shaped, or shaped otherwise in a different configuration.

Figure 16:
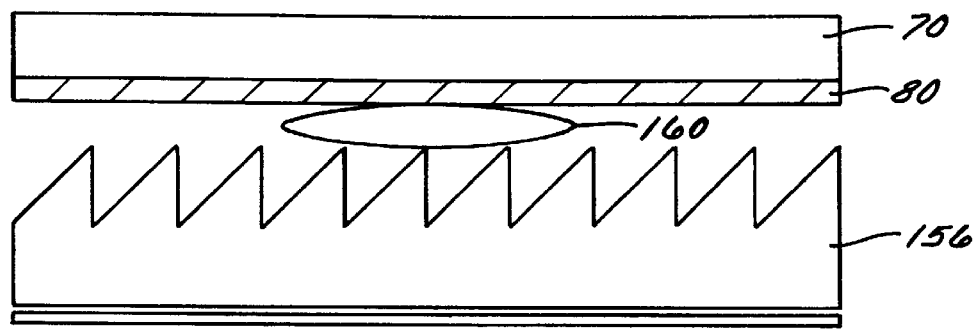
FIG. 16 shows a molding step in fabricating the microprism array where a liquid hardenable material is provided between a substrate to which it is being molded and a master.

Referring to FIG. 16, the master 138 shown in FIG. 15 preferably is used to make another master 156 that preferably is of one-piece, unitary construction and which is comprised of a photopolymer. The photopolymer master 156 is then used to replicate one-half 158 of the panel assembly 46, such as the rear half 158 shown in FIG. 4. Prior to doing so, pane 70 is coated with conductive layer 82 and is preferably also coated with alignment layer 80. Thereafter, pane 70 is positioned adjacent the master 156 and a small amount of a hardenable material 160, typically only a drop or two, is disposed between the pane 70 and the master 156.

The hardenable material 160 preferably is a liquid that flows into the voids between the ridges of the master 156. The hardenable material 160 then hardens to substantially conform to a shape complementary to the master 156 thereby integrally forming array 44 onto pane 70.

Figure 17:
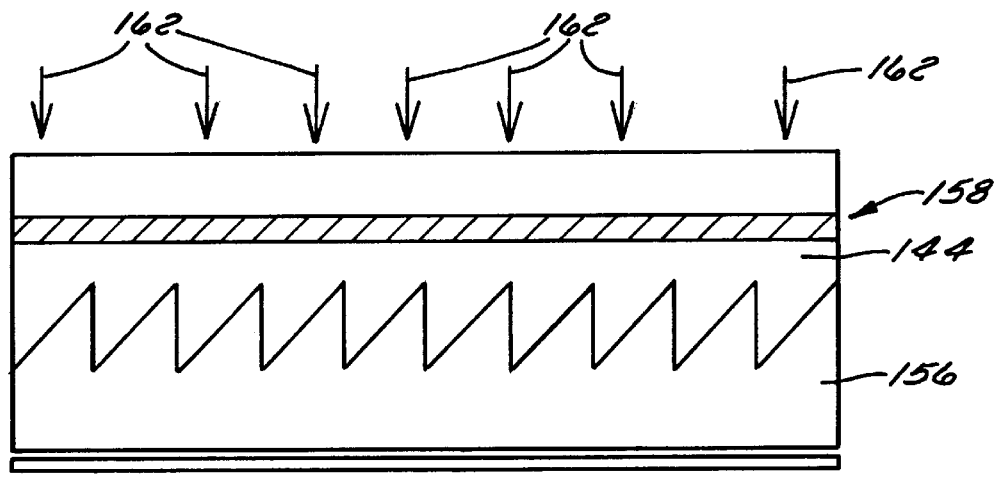
FIG. 17 illustrates a curing step where the hardenable material is cured by the application of light.
Figure 18:
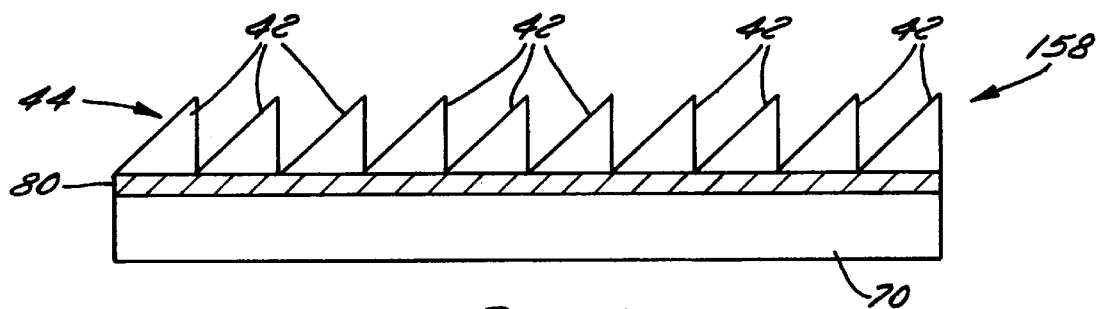
FIG. 18 illustrates the microprism array after being molded and cured.

Referring to FIG. 17, the hardenable material 160 preferably is cured using light 162 that preferably is ultraviolet light. After curing is complete, the panel assembly half 158 is removed from the master 156 and the master 156 is once again ready to be used to fabricate another panel assembly half 158. FIG. 18 illustrates the completed panel assembly half 158 after it has been removed from master 156.

An example of a preferred hardenable material 160 capable of being formed in the above-described manner is Norland NOA 72 epoxy having the following typical properties listed above in Table 1. In fabricating a 3 inch by 3 inch square array 44 of prisms 42 that are each no thicker than about 10 μm to about 20 μm, only one or two drops of the NOA 72 epoxy 160 are needed. A desirable feature of NOA 72 epoxy is that it requires only ultraviolet light to cure and does not require any heat thereby avoiding heat-related stress. NOA 72 is also desirable because it has excellent light transmission characteristics, greater than 95%, over a broad range of wavelengths ranging from 450 nanometers (nm) to 3 μm. In addition, NOA 72 possesses excellent thermal stability over a wide temperature range from −40° C. to 110° C. and is suitable for military optics applications.

Figure 19:
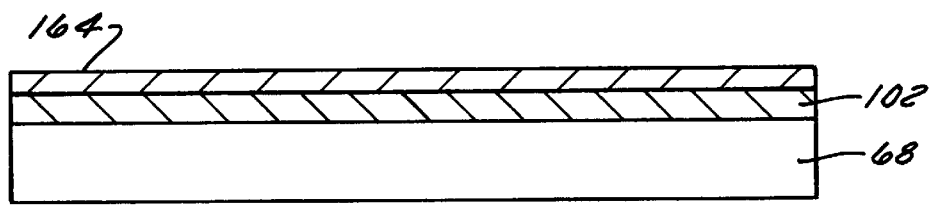
FIG. 19 illustrates a step preparatory to fabricating an array of microprisms composed of a variable refractive index material.

Referring to FIG. 19, in preparation for fabricating the variable refractive index material into prisms 48, a layer 164 of an anchoring material is applied over the layer 102 of conductive material. The anchoring layer 164 preferably is thin and preferably no greater than about few thousand angstroms (Å) thick. The anchoring layer preferably helps anchor the variable refractive index material to pane 68. The layer 164 preferably also helps align at least some of the molecules of the variable refractive index material.

One preferred anchoring material is DuPont PI2555 polyimide that preferably is applied on top of the conductive layer 102 by spin coating. After spin coating, the anchoring layer 164 preferably is baked to help bond it to the conductive layer 102. Thereafter, the layer 164 is rubbed to form pockets in the layer 164 in which molecules of the variable refractive index material are trapped and aligned.

During spin coating, a spin rate of about 3000 revolutions per minute preferably produces a layer 164 of the anchoring material that is about 2000 Å thick. During baking, the layer 164 is baked at a temperature of about 275° C. for about one hour. After baking, the layer 164 preferably is unidirectionally rubbed using Yoshikawa "Finepuff" brand rubbing pile fabric or the like to make grooves in the layer 164 in which the variable refractive index material is to be trapped and aligned when the variable refractive index material is applied to the pane 68.

Referring to FIGS. 20–24, the exposed faces 56 and 60 of each of the prisms 42 of array 44 can also be rubbed to align molecules of the variable refractive index material when the variable index material is applied. As a result of this rubbing, alignment of the molecules of the variable refractive index material is further improved.

Figure 21:
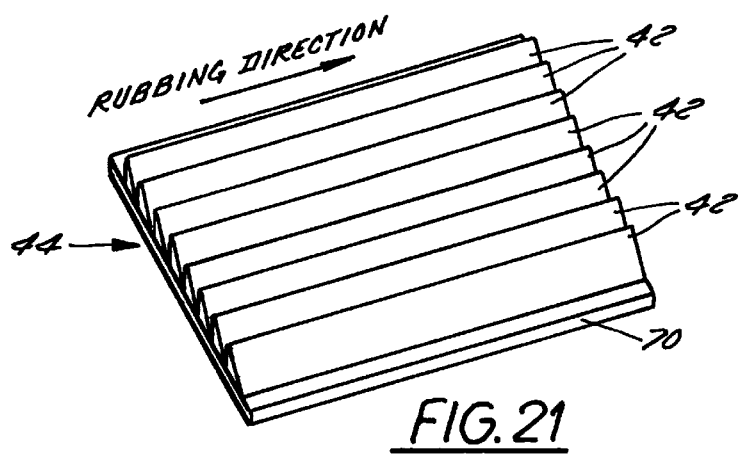
FIGS. 20 and 21 illustrates rubbing in a first preferred manner to form a parallel or π-cell panel assembly.
Figure 20:
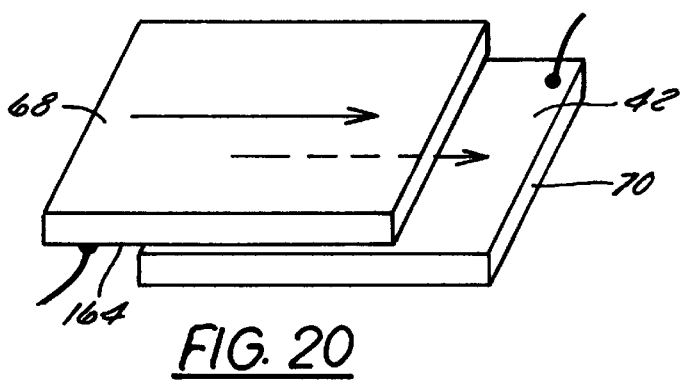
Figure 22:
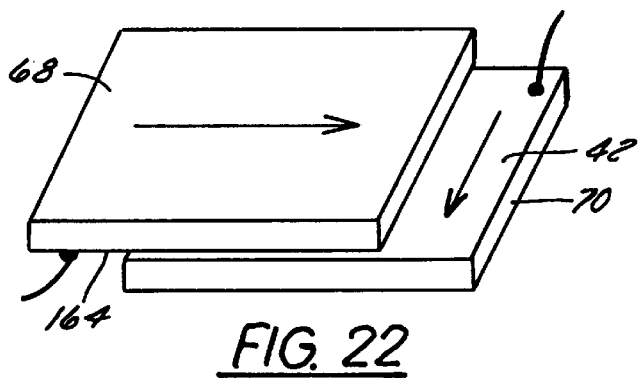
FIG. 22 illustrates rubbing in a second preferred manner to form an anti-parallel cell panel assembly.
Figure 23:
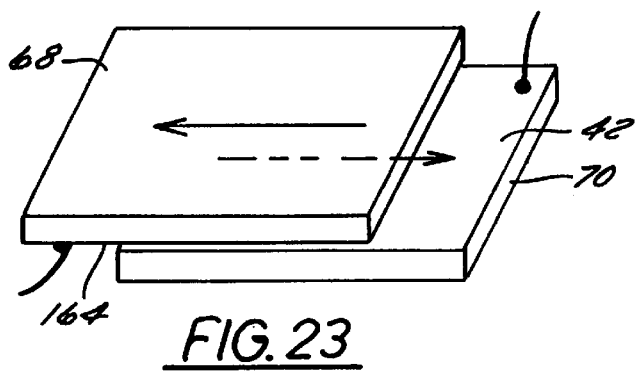
FIG. 23 illustrates rubbing in a third preferred manner to form a crossed cell panel assembly.

As is shown in FIGS. 20 and 21, rubbing can be performed along the lengthwise direction of each of the prisms 42 and along the same direction on the anchor layer 164 on pane 68 to form a parallel or π-cell. Referring to FIG. 22, the prisms 42 can be rubbed transversely to their lengthwise direction and the anchor layer 164 is rubbed in a direction generally perpendicular to the prism rubbing direction to form a crossed cell. Referring to FIG. 23, the prisms 42 and anchor layer 164 can be rubbed in opposite directions to form an anti-parallel cell.

Figure 24:
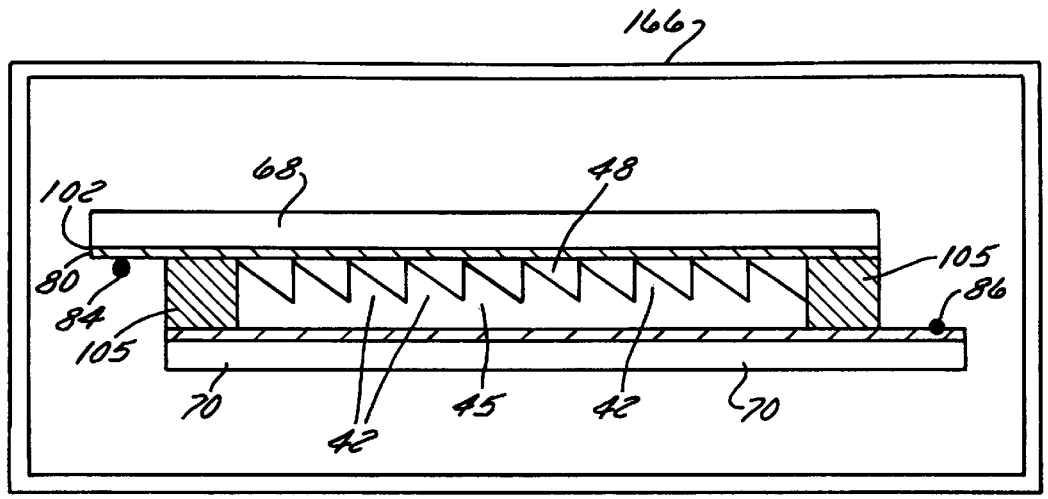
FIG. 24 illustrates forming the array of prisms composed of a variable refractive index material in a vacuum oven.

Referring to FIG. 24, the front pane 68 is positioned over the array 44 of prisms 42 and the rear pane 70 with the spacer 105 spacing the panes 68 and 70 apart. With the panes 68 and 70 spaced apart, a cavity is left between the prisms 42, the spacer 105, and the front pane 68. The entire assembly is placed in a container well of a vacuum oven 166 and a vacuum is introduced in the cavity to cause variable refractive index material to be drawn into the cavity. Preferably, the temperature of the vacuum oven 166 is controlled to achieve good initial alignment of the variable refractive index material. Preferably, the oven 166 operates at a temperature deep in the isotropic phase of the variable refractive index material to achieve an array 88 of prisms 48 possessing good uniformity. After the cavity is filed, the completed panel assembly or cell 46 is lifted from the container well and the vacuum is released so the panel assembly 46 can be removed from the oven 166.

If the master 156 is made from master 138, the following steps preferably are performed in making master 156. First, a nickel or copper master is turned using a desired diamond to create a specific aspect ratio. Second, the structures from the nickel or copper master are transferred to a plastic submaster through compression or injection molding. Third, a rubber submaster 156 is generated from the plastic submaster. Finally, a final prismatic structure is imparted to the master 156 by multiple ultraviolet light replications such that the prismatic structure will have a desired angle and a desired aspect ratio.

IV. Two-Dimensional Beam Deflector

FIGS. 25–27 illustrate a two-dimensional beam deflector 52 having a pair of cells or panel assemblies 46a and 46b orthogonal to each other such that a beam 50 passing through the first panel assembly 46a can be deflected in one direction and passing through the second panel assembly 46b can be deflected in another direction. In this manner, photons of a beam 50 passing through the deflector 52 can be deflected one-dimensionally or two-dimensionally and therefore can be selectively directed much like an electron gun directs electrons in a television picture tube.

As is shown in FIGS. 25–27, the panel assemblies 46a and 46b are oriented such that the prisms 42 of panel assembly 46a are crossed such that they are generally perpendicular to the prisms of panel assembly 46b. Between the two crossed panel assemblies 46a and 46b is a relatively thin twisted nematic liquid crystal plate 168 that functions as a polarization rotator. The polarization rotator 168 preferably rotates the polarization of the beam 50 after it passes through the first panel assembly 46a so it is properly polarized before it passes through the second panel assembly 46b. Preferably, the polarization rotator 168 rotates the polarization of the beam 50 through 90°.

All of these layers 46a, 168, and 46b are sandwiched together to form a deflector 52 that is of one-piece, unitary and monolithic construction. Preferably, the cross-sectional thickness of the deflector 52 is only a few millimeters thick. Preferably, the cross-sectional thickness is no greater than ten millimeters.

As is shown in FIG. 25, a beam 50 passing through the first panel assembly 46a is deflected at an angle, $\alpha_1$, that is acute relative to the direction of the incoming beam 50 and which is deflected in a direction generally perpendicular to the lengthwise axis of the prism 42 of the panel assembly 46a it is passing through. After its polarization is changed by the polarization rotator 168, the once-deflected beam 50' is further deflected as it passes through the second panel assembly 46b. As the beam 50' passes through the second panel assembly 46b, it is deflected at an angle, $\alpha_2$, that is acute relative to its incoming direction and which is deflected in a direction generally perpendicular to the lengthwise axis of the prism 42 of the panel assembly 46b it is passing through. After being deflected by the second panel assembly 46b, the twice-deflected beam 50" emerges from the second panel assembly 46b.

In this manner, a single beam 50 can be deflected both horizontally and vertically as it passes through the beam deflector 52, or just horizontally, or just vertically. Additionally, a plurality of pairs of beams 50 can be substantially simultaneously deflected both horizontally and vertically as they substantially simultaneously pass through the beam deflector 52, or just horizontally, or just vertically. For example, FIG. 25 depicts the deflector 52 deflecting a single beam 50 both horizontally and vertically. FIG. 26 depicts the deflector 52 deflecting a plurality of pairs of beams 50 at the same time only in the vertical direction, i.e. in the Y-direction. FIG. 27 depicts the deflector deflecting a plurality of pairs beams 50 at the same time only in the horizontal direction, i.e. in the X-direction. By selectively controlling beam deflection in each dimension, the deflector 52 can actually scan a single beam 50 or multiple beams 50 up and down and back and forth to scan an object located a distance away from the deflector 52. Advantageously, each beam 50 is deflected without the deflector 52 moving.

Each panel assembly 46a and 46b is connected to a separate source of electricity, $V_1$ and $V_2$, that is each capable of being varied so as to independently vary the angle of deflection of the particular panel assembly 46a and 46b. If desired, the beam deflector 52 can be constructed without pane 70 of panel assembly 46a and without pane 68 of panel assembly 46b.

Figure 28:
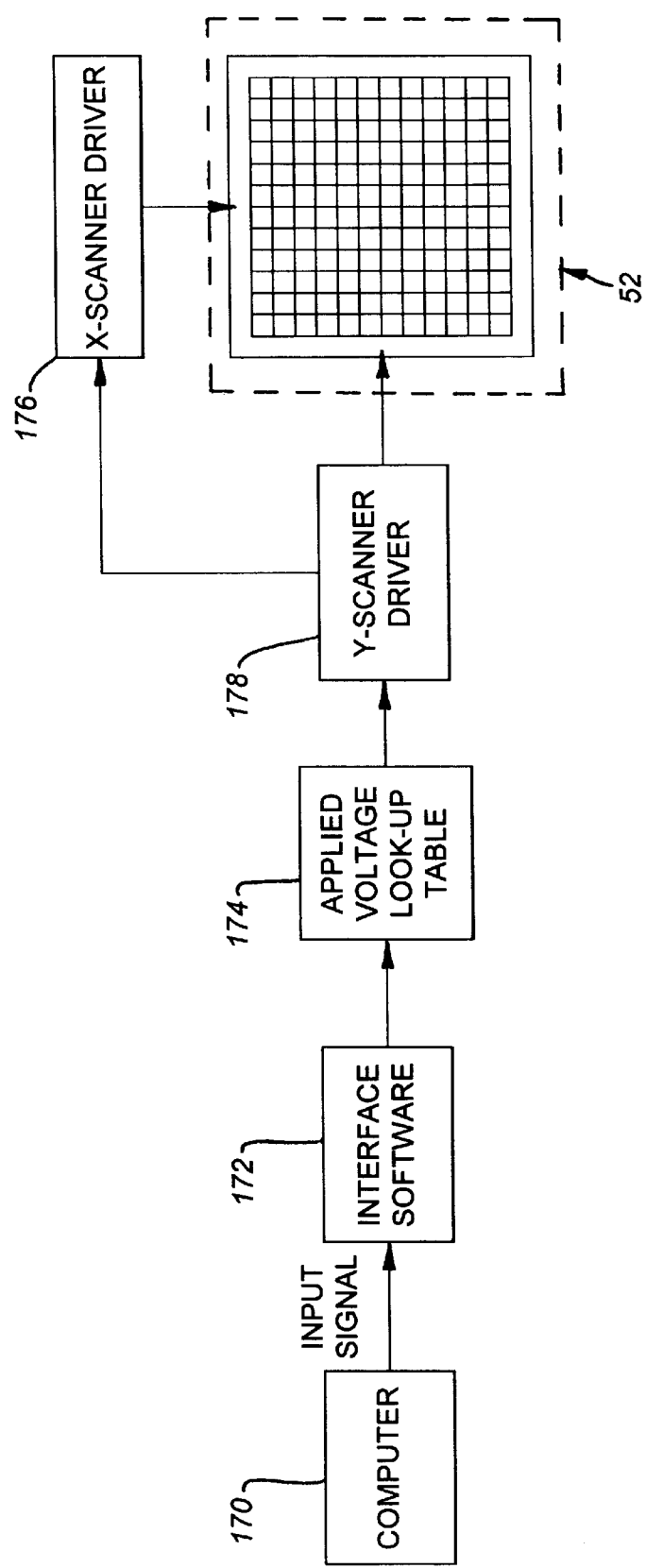
FIG. 28 illustrates a control schematic for controlling operation of the two-dimensional beam deflector.
Figure 29:
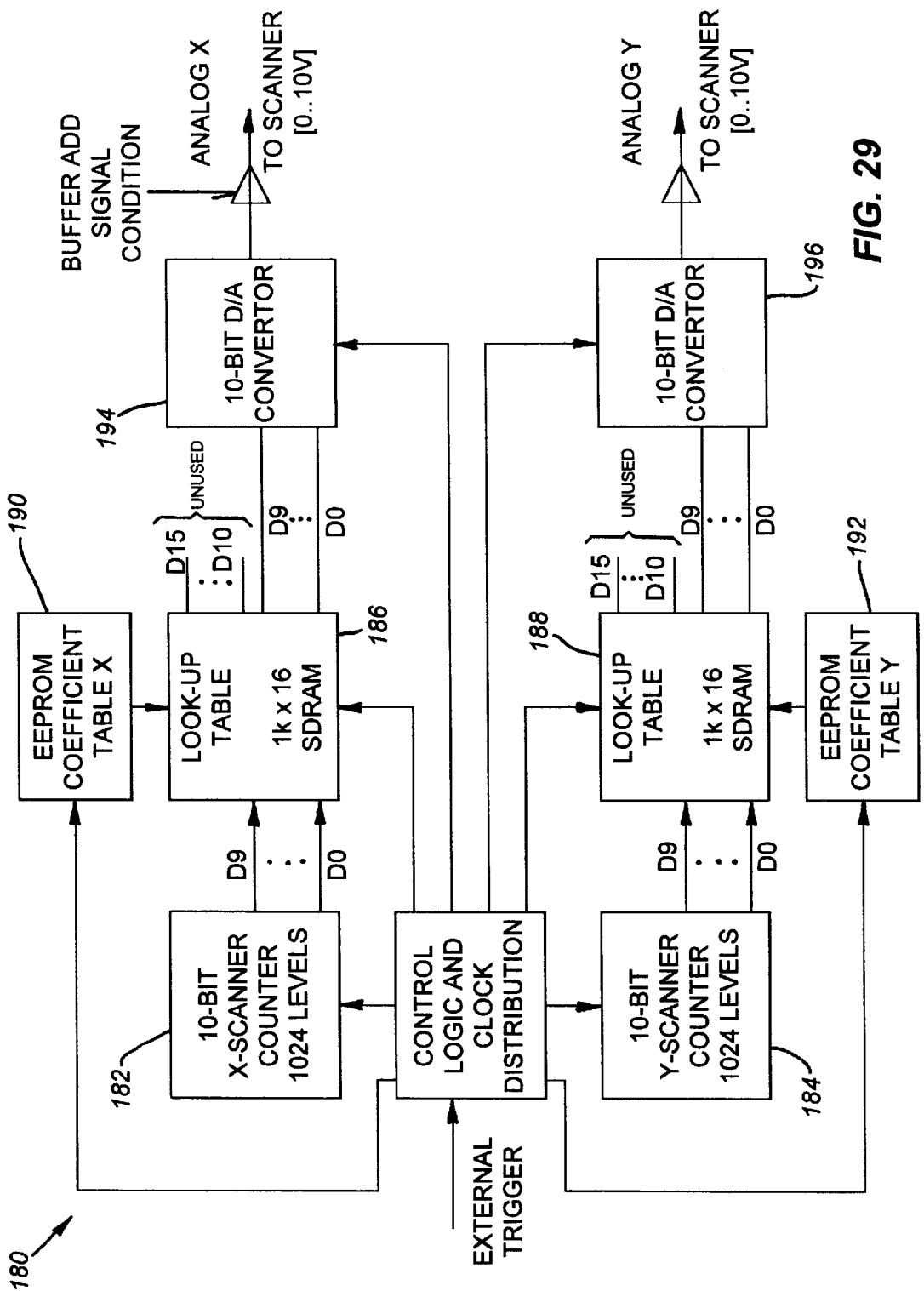
FIG. 29 illustrates one preferred digital circuit schematic of a controller for controlling operation of the two-dimensional beam deflector.

FIGS. 28 and 29 illustrate schematics of circuitry capable of independently controlling the voltage applied to the panel assemblies 46a and 46b so as to control the deflection of a beam 50 passing through the deflector 52 in two dimensions, such as the X and Y dimensions. Referring to FIG. 28, the deflector 52 is controlled by a computer 170 that cooperates with interface software 172 to coordinate the use of an applied voltage lookup table 174 used by an X-scanner driver 176 and a Y-scanner driver 178 to deflect the beam 50 relatively precisely as it passes through the deflector 52. The X-scanner driver 176 is responsible for precisely deflecting the beam 50 in the X-direction and the Y-scanner driver 178 is responsible for deflecting the beam 50 in the Y-direction.

For example, the X-scanner driver 176 controls how much voltage from source, $V_1$, is applied to panel assembly 46a to precisely deflect the beam 50 at a desired angle, $\alpha_1$ or $\alpha_x$, as it passes through the panel assembly 46a. Additionally, the Y-scanner driver 178 controls how much voltage from source, $V_2$, is applied to the panel assembly 46b to precisely deflect the once-deflected beam 50' at a desired angle, $\alpha_2$ or $\alpha_y$.

Preferably, for a given set of desired deflection angles, $\alpha_x$, $\alpha_y$, commanded by the computer 170, the software 172 causes the lookup table 174 to be accessed to select the appropriate voltage value for each driver 176 and 178 that achieves the desired deflection angles, $\alpha_x$, $\alpha_y$. The appropriate voltage values are used as a reference by each driver 176 and 178 to drive the output voltage to its panel assembly 46a and 46b to match the appropriate voltage value.

An exemplary circuit 180 for interfacing with the deflector 52 to cause the deflector 52 to scan a beam 50 up and down and back and forth in a predetermined pattern is shown in FIG. 29. Preferably, the scanner circuitry 180 is driven by a high-speed electronic control subsystem implemented in field programmable gate arrays (not shown).

The proper voltage level for each panel assembly 46a and 46b is generated digitally by an X-counter 182 and a Y-counter 184 that are each preferably of 10-bit construction. The proper voltage level generated is preferably in response to desired X and Y deflection angles, $\alpha_x$, $\alpha_y$, communicated from a computer, such as computer 170. The X-lookup table 186 and the Y-lookup table 188 preferably stored in a memory that each respectively compensate for the non-linear response to voltage exhibited by the variable refractive index material, e.g. the liquid crystal material 48. An example of such non-linear response is shown in FIG. 7. Each lookup table 186 and 188 preferably is stored in a SDRAM integrated circuit but can be stored on another storage device. Each lookup table 186 and 188 also respectively communicate with a coefficient table contained in another storage device 190 and 192 that preferably is an EEPROM or the like. The output from each lookup table 186 and 188 is respectively converted by a digital-to-analog converter 194 and 196 that preferably also is of 10-bit construction. The analog voltage output from each converter 194 and 196 preferably is buffered and amplified before it is applied to the terminals 84 and 86 of the respective panel assembly 46a and 46b.

Using such circuitry, one or more beams 50 preferably can be scanned up and down and back and forth several thousand times per second. Preferably, one or more beams 50 can be scanned in a repeating predetermined pattern at least as fast as 10 kilohertz.

V. Scanner

Figure 30:
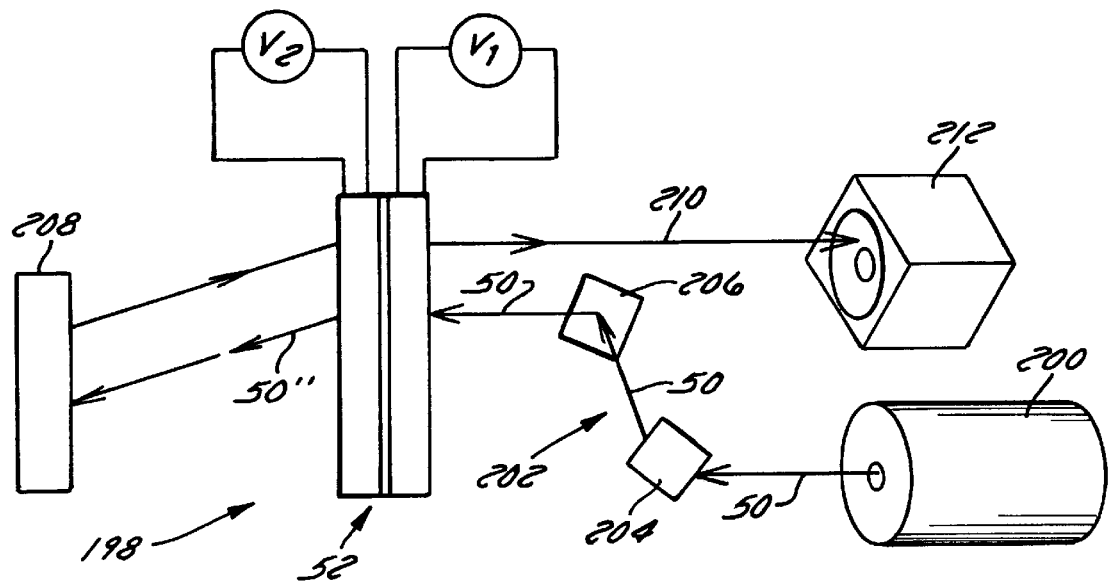
FIG. 30 illustrates an exemplary two-dimensional scanner assembly using the two-dimensional beam deflector.

FIG. 30 illustrates a scanner assembly 198 using the two-dimensional beam deflector 52. The assembly 198 has an emitter 200 from which at least one beam 50 is emitted. The beam 50 preferably is emitted toward a beam director assembly 202 that comprises a pair of spaced apart mirrors 204 and 206 that enable the emitter 200 to be spaced laterally a distance from the rear of the deflector 52. The beam 50 is directed through the deflector 52 where circuitry, such as the circuitry shown in FIGS. 28 and 29, two-dimensionally deflects the beam 50" to scan an object 208 located a distance from the deflector 52.

Such an object 208 preferably has a two-dimensional or three-dimensional surface or contour that is scanned with beam 50". The beam 50" impinging against the object 208 cause one or more beams 210 to be reflected toward a detector 212 that preferably receives the beams 210. The detector 212 preferably is in communication with an analyzer (not shown) capable of analyzing the reflected beams 212 for a particular purpose. Preferably, such an analyzer includes at least one processor, digital circuitry, and software capable of analyzing the reflected beams 210 for the purpose of extracting information therefrom or producing an image therefrom. Other types of analysis can be performed on the reflected beams 210, if desired.

Objects 208 that can be scanned in this manner include the scanning of two-dimensional and three-dimensional objects. Just a few examples of some objects that can be scanned with the scanner of this invention include paper, retinas, humans, and targets. Other uses are also possible. For example, such a scanner 198 may be well suited for scanning the Earth from a satellite carrying the scanner 198. Additionally, the scanner is also well suited for scanning beams emitted or reflected from the object 208, as well.

The emitter 200 preferably is a source of light that preferably is collimated light from a laser or the like. The detector 212 preferably is constructed and arranged to sense reflected beams 210 of the light emitted from the emitter 200 and produce electrical signals therefrom. Examples of suitable detectors 212 include a charge-coupled device (CCD) as well as a digital camera.

Using the circuitry previously described and shown in FIGS. 28 and 29, the scanner 198 of this invention preferably can meet at least the following specifications:

TABLE 3

| Field-of-view in X-direction | 30° |
|---|---|
| Field-of-view in Y-direction | 30° |
| Resolution in X-direction | 0.4 mrad |
| No. of Resolvable Spots in X-direction | 1,316 |
| Resolution in Y-direction | 0.4 mrad |
| No. of Resolvable Spots in Y-direction | 1,316 |
| Line duration | 100 μs |
| Point-to-Point time duration | 76 ns |
| Point frequency | 13.16 MHz |

The desired resolution of greater than 1,300 resolvable points that can be read during a scan of a desired region preferably requires digital driving, such as the digital drivers disclosed in FIG. 29. The two counters, one for the X-direction and the other for the Y-direction, generate periodic pulses that are converted to analog voltages to ramp from 0 volts to the desired maximum voltage, in the preferred case, 10 volts. Digital control is also used to compensate for the non-linear characteristics of the specific variable refractive index material used for prisms 48.

The beam 50 preferably is scanned in the X- and Y-directions by 10-bit counters 182 and 184 counting from 0 to 1023. Their output [$D_0 \ldots D_9$] will go to the associated look-up table 186 and 188 of address lines for nonlinearity compensation. The 1k×16 look-up tables 186 and 188, preferably implemented in SDRAM, remap the data. The use of SDRAM advantageously permits about 70 nanosecond (ns) point-to-point scanning transition. The nonlinearity coefficients stored in EEPROMs 190 and 192 will preferably be transferred to the SDRAMs 186 and 188 at system power-up. The output of the SDRAM [$D_{s0} \ldots D_{s9}$] 186 and 188 will be converted by 10-bit D/A converters 194 and 196 into an analog voltage levels that control the desired deflection angles, $\alpha_x$ and $\alpha_y$. Additional analog buffering preferably will be required to ensure sufficient current drain and voltage levels. The D/A converters 194 and 196 can operate using commercially available 13–15 megahertz clocks.

If desired, the scanner 198 can operate without a beam source 200 such that ambient light 210 emitted by the object 208 or light 210 reflected from the object 208 can pass through the beam deflector 52 where it preferably is focused toward or onto the detector 212 by the deflector 52. Where such is the case, the deflector 52 preferably is oriented such that the reflected beam 210 passes first through panel assembly 46a before passing through panel assembly 46b and that the beam 210 first passes through array 88 of the panel assembly 46a.

VI. Laser Imaging Radar

Figure 31:
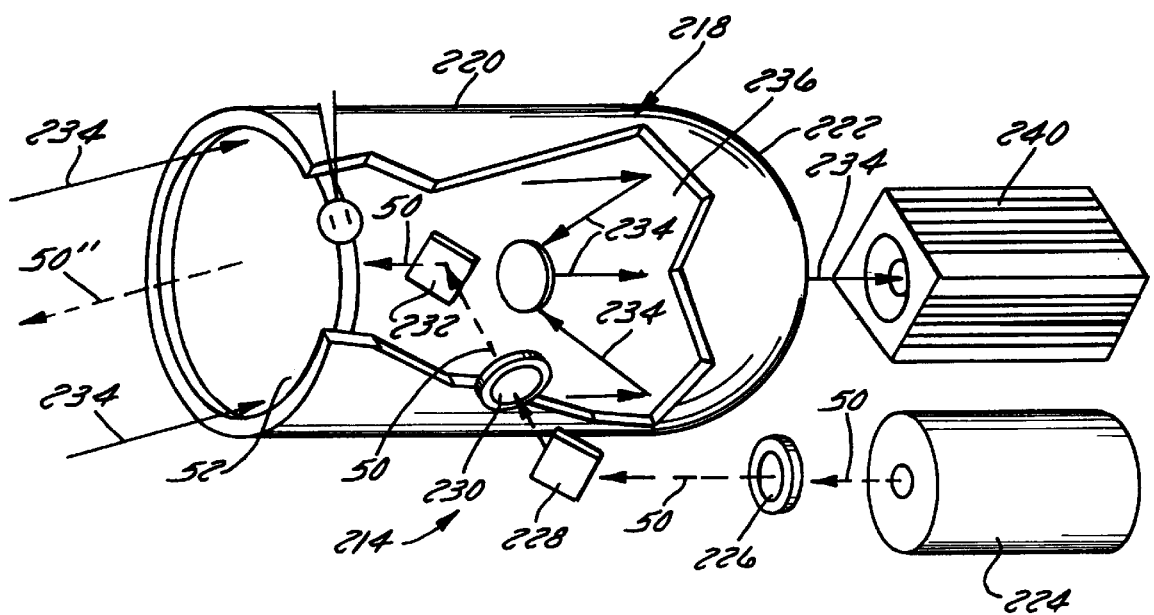
FIG. 31 depicts a laser imaging radar device using the two-dimensional beam deflector.
Figure 32:
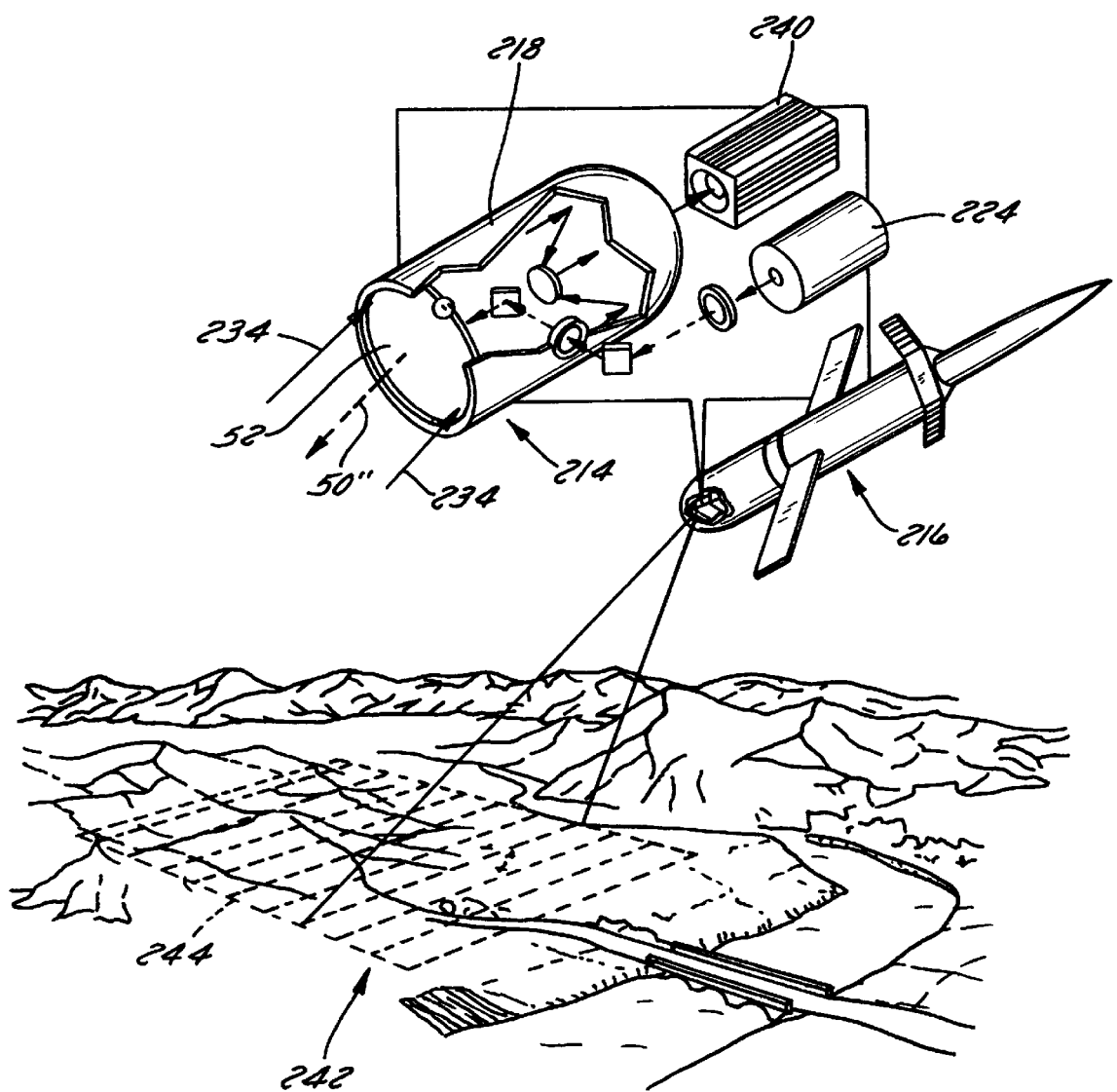
FIG. 32 depicts a laser imaging radar device on board of a rocket or missile that can be used, for example, in seeker applications or for target acquisition.

FIGS. 31 and 32 illustrates a laser imaging radar scanner assembly 214, similar to scanner assembly 198, that uses the two-dimensional beam deflector 52 and which is carried by a vehicle 216 that preferably is airborne. While the airborne vehicle 216 shown in FIG. 32 is a rocket or a missile, the assembly 214 can also be carried by an airplane, a drone, a balloon, a dirigible, a satellite, or another airborne vehicle. The assembly 214 preferably is disposed at or near the front of the vehicle 216 but can be located in another location provided its field of scan is relatively unobstructed.

The deflector 52 is mounted in a tubular housing 218 that has a sidewall 220 and an endwall 222. The emitter 224 preferably is disposed outside the housing 218 and is a laser from which a laser beam 50 is emitted. The beam 50 passes through an optic 226 that can be a polarizer where it impinges against a first mirror 228 that reflects the beam 50 through a lens or port 230 in the housing sidewall 220 into the housing 218. A second mirror 232 inside the housing 218 reflects the beam 50 out the front of the housing 218 where it passes through the deflector 52.

The deflector 52 scans the beam 50" across the object being scanned causing beams 234 to be reflected back toward the deflector 52. The reflected beams 234 pass through the deflector 52 into the housing 218 where the beams 234 are focused by an optic 236 carried by the housing endwall 222 that preferably is a mirror of parabolic construction. The mirror 236 focuses the reflected beams 234 toward another mirror 238 within the housing 218 that reflects the beams 234 to a laser detector 240 that preferably is located outside the housing 218 behind the housing endwall 222. The second mirror 238 preferably reflects the beams 234 through a port (not shown) in the endwall 222 toward the detector 240. Preferably, the housing 218, deflector 52, arrangement of optics and mirrors 226–232, are constructed and arranged so that the detector 240 receives an image of the object 242 being scanned. If desired, the deflector 52 can also be used to deflect the beams 234 of light reflected from the object or terrain being scanned as they pass through the deflector 52. As is shown in FIG. 32, the object 242 being scanned is the terrain 242 in front of and below the vehicle 216. The boundaries of the region 244 being scanned are shown in phantom in FIG. 32. As is shown by the scanned region 244, the beam 50" is scanned both horizontally and vertically across the region 244. Advantageously, scanning is accomplished without any component of the scanner assembly 214 ever moving. More specifically, the beam deflector 52 does not move during scanner 214 operation.

An image of the scanned region 244 preferably is reproduced at the detector 240 that preferably is processed, such as by digital signal processing or the like. The processed image can then be compared against a map stored on board the vehicle 216, such as a digitized map, for use in targeting the vehicle 216 or for use in navigation and guidance of the vehicle 216.

The laser 224 preferably is an infrared laser having a wavelength of between about 1.2 $\mu$m and about 1.5 $\mu$m such that it will not damage the eyes of any person in the vicinity of the region 244 being scanned. Preferably, the laser 224 has a beam diameter no greater than about one centimeter for enabling it to be quickly scanned in two dimensions.

The deflector 52 is circular and has a diameter of about 3.5 inches. To scan a desirably large region 244, the deflector 52 has a field of view or a field of regard of about 30° by about 30° and preferably takes no longer than about 100 $\mu$s to make a single scan of the entire region 244. Thus, the deflector 52 has a maximum scan angle, $\alpha_{xmax}$, in the X-direction of at least about 30° and a maximum scan angle, $\alpha_{ymax}$, in the Y-direction of at least about 30°. The deflector 52 preferably can scan one dimension no slower than about 100 $\mu$s and the second dimension no slower than about 30 ms.

For example, the deflector 52 can make one complete scan from left to right or right to left (X-direction) no slower than about 100 $\mu$s and from top to bottom or bottom to top (Y-direction) no slower than about 30 ms. Alternatively, the deflector 52 can make one complete scan from left to right or right to left (X-direction) no slower than about 30 ms and from top to bottom or bottom to top (Y-direction) no slower than about 100 $\mu$s. The image resulting from a single scan of the region 244 is a frame. Preferably, the deflector 52 having the aforementioned characteristics can scan fast enough to provide the detector 240 with about a frame rate that is 30 hertz or greater.

Preferably, the laser imaging radar assembly 214 has at least the following specifications:

TABLE 4

| | |
|---|---|
| Clear aperture: | 7.5 cm × 7.5 cm |
| Pointing resolution: | <620 $\mu$rad |
| Response time: | <100 $\mu$s |
| Transmission: | >50% |
| Field-of-regard: | 30° × 30° |
| Laser wavelength: | 1.54 $\mu$m |
| Total beam energy: | 250 mJ per 8 ns pulse |

The clear aperture measurement is the size of the beam deflector through which the beam 50 can actually pass. The pointing resolution is how accurately the beam 50 can be deflected both in the X-direction ($\alpha_x$) and in the Y-direction ($\alpha_y$). The response time is how fast the deflector 52 can repeat a scan over the entire field-of-regard. Transmission reflects how efficiently light is transmitted through the deflector 52. Laser wavelength is the desired wavelength of the laser 224 from which beam 50 is emitted. The total beam energy is how much energy is emitted by the laser 224 during a pulse time of, for example, 8 nanoseconds.

To achieve these desired characteristics, each prism 48 and 42 of each panel assembly 46a and 46b have a pitch or height no greater than about 10 $\mu$m using liquid crystal material 48 having a response time of at least about 30 $\mu$s. Preferably, the liquid crystal material 48 is a ferroelectric liquid crystal material. Preferably, the liquid crystal material 48 used to form prisms 48 has a birefringence or $\Delta$n of at least about 0.25 or 0.26 such that $\alpha_{max}$ can be as great as about 45° with an applied voltage of between 0 volts and about 10 volts.

TABLE 5

| Parameter | Values | Result |
|---|---|---|
| Microprism size | 10 $\mu$m × 10 $\mu$m × 7.5 cm (45°–60° prism angle) | Liquid crystal thickness ≦10 $\mu$m required for $\mu$s-ms speed |
| Liquid crystal material | High speed nematic or ferroelectric liquid crystal ($\Delta$n = 0.2–0.3) | Scan angle >30° or ≈30° |
| Liquid crystal microprism | • Parallel alignment<br>• Uniform or nonuniform electric field | Highest $\Delta$n for a given liquid crystal, Parallel or prismatic ITO layers |
| Aperture size | 3" × 3" (7.5 cm × 7.5 cm) | 7500 × 7500 microprism array |
| Pointing resolution | 620 $\mu$rad | 10-bit modulation |
| Beam divergence | <200 $\mu$rad | Wavefront error <2.6 $\lambda$ ($\lambda$ = 1.54 $\mu$m) |

TABLE 5-continued

| Parameter | Values | Result |
|---|---|---|
| Response time | <100 μs (agile) ms - microseconds | 30 μs response of DHFLC (ferroelectric liquid crystal) |
| Transmission | >80% | Fresnel reflection loss at interfaces |
| Scan angle | ≧ 30° × 30° | Liquid crystal material with Δn ≈ 0.2 |
| Laser damage threshold | >1 J per 1 ns pulse | at 1.064 μm (Nd:YAG laser) |

The two-dimensional deflector 52 preferably can also be constructed having the characteristics presented in Table 5 above. It should be noted that an example of a suitable laser producing the desired beam 50 having the desired wavelength or wavelength range and beam diameter is a neodium:YAG laser.

If it is desired to make a three-dimensional scanning assembly, three panel assemblies 46 can be sandwiched together with a layer of twisted nematic liquid crystal plate 168 between each adjacent pair of panel assemblies 46.

If desired, the two-dimensional beam deflector 52 can be used as a targeting device for selectively directing a laser beam 50, or other high energy density beam, onto an object 242 that is moving. One example of such a use for the targeting device 52 is to direct a beam 50 onto an incoming aircraft, missile, or rocket object 242 to disable or destroy it. The targeting device 52 does not move during operation and can advantageously direct the beam 50 in two-dimensions sufficiently quickly enough to direct the beam onto an object 242 moving several hundred and even thousands of miles per hour.

It is also to be understood that, although the foregoing description and drawings describe and illustrate in detail preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A beam deflector for deflecting a beam of electromagnetic energy comprising:
   a plurality of first prisms having a pitch of between 20 μm and 100 μm and (1) a refractive index capable of varying in the presence of an electric or magnetic field, (2) a first face through which the beam enters the plurality of first prisms, and (3) a second face through which the beam exits the plurality of first prisms;
   a plurality of second prisms having (1) a refractive index that remains substantially constant, (2) a first face through which the beam enters the plurality of second prisms, and (3) a second face through which the beam exits the plurality of second prisms;
   wherein the plurality of first prisms and plurality of second prisms are mated such that the second face of the plurality of first prisms is disposed adjacent the first face of the plurality of second prisms;
   a source of an electric or magnetic field constructed and arranged such that the field extends at least through the plurality of first prisms; and
   a first conductive layer disposed adjacent the first face of the plurality of first prisms and a second conductive layer disposed adjacent the second face of the plurality of second prisms and a voltage source electrically connected to the first conductive layer and the second conductive layer for providing the electric field or the magnetic field through the plurality of first prisms when a voltage from the voltage source is applied to the first conductive layer and the second conductive layer;
   wherein changes in the flux of the electric field or the magnetic field change the refractive index of the plurality of first prisms thereby changing the angle at which the beam is deflected when passing through the plurality of first prisms and plurality of second prisms.

2. The beam deflector of claim 1 wherein the plurality of first prisms and the plurality of second prisms both respond to a change in the electric field or the magnetic field no slower than about 100 μm.

3. The beam deflector of claim 2 wherein the pitch comprises the thickness of at least one of the plurality of first prisms and the plurality of second prisms in a direction generally parallel to the direction of the beam.

4. The beam deflector of claim 2 wherein the beam has a diameter less than about 100 μm.

5. The beam deflector of claim 2 wherein the plurality of first prisms and the plurality of second prisms each have a width no greater than about 30 μm.

6. The beam deflector of claim 2 wherein the plurality of first prisms changes its refractive index when responding to the change in the electric field or the magnetic field.

7. The beam deflector of claim 1 wherein the plurality of first prisms changes its refractive index in response to a change in the electric field or the magnetic in no more than about 30 μs.

8. The beam deflector of claim 1 wherein the first conductive layer and the second conductive layer are comprised of indium tin oxide.

9. The beam deflector of claim 1 wherein the plurality of first prisms and the plurality of second prisms both have a generally triangular cross section and an apex angle between about 45° and about 60°.

10. The beam deflector of claim 9 wherein the pitch comprises the maximum cross-sectional thickness in a direction generally parallel to the direction of the beam, the apex angle of the plurality of first prisms comprises the angle between the first face and the second face of the plurality of first prisms, and the apex angle of the plurality of second prisms comprises the angle between the first face and the second face of the plurality of second prisms.

11. The beam deflector of claim 9 wherein the plurality of first prisms and the plurality of second prisms are both at least one centimeter long.

12. The beam deflector of claim 3 wherein the plurality of first prisms is comprised of a variable refractive index material whose refractive index can change as much as 0.2 depending upon the flux or magnitude of the electric or magnetic field applied.

13. The beam deflector of claim 7 comprises a plurality of pairs of the first prism arranged in a first array and a plurality of pairs of the second prism arranged in a second array wherein (1) the first array of the first prisms and the second array of the second prisms are mated together and (2) the first array and the second array are oriented generally perpendicular to the direction of the beam.

14. The beam deflector of claim 13 further comprising (1) a first pane disposed on one side of the first and second arrays and (2) a second pane disposed on another side of the first and second arrays, wherein (1) the first pane and the second pane are oriented generally perpendicular to the direction of the beam and (2) the first pane, the first array, the second array and the second pane define a panel assembly.

15. The beam deflector of claim 14 further comprising a beam polarizer disposed in front of the panel assembly such that the beam passes through the polarizer before the beam passes through the panel assembly.

16. The beam deflector of claim 14 further comprising (1) a first conductive layer disposed between one of the panes and one of the arrays, (2) a second conductive layer disposed between the other of the panes and the other of the arrays, (3) a voltage source electrically connected to (i) the first conductive layer and (ii) the second conductive layer such that the magnitude of the electric field applied to each of the first prisms is substantially the same.

17. The beam deflector of claim 16 wherein the first conductive layer is disposed between the first pane and the first array and the second conductive layer is disposed between the second pane and the second array.

18. The beam deflector of claim 16 wherein one of the conductive layers is disposed between the first array and the second array for creating a non-uniform electric or magnetic field in each of the first prisms.

19. The beam deflector of claim 14 further comprising means for compensating for the temperature of the panel assembly in operable communication with the panel assembly.

20. The beam deflector of claim 19 wherein the temperature compensating means comprises a temperature sensor and a heater in contact with the panel assembly.

21. The beam deflector of claim 20 wherein the temperature sensor is not in contact with the panel assembly and the heater comprises an electrically heated thermal blanket in contact with the panel assembly that selectively heats the panel assembly in response to the temperature sensed by the temperature sensor.

22. The beam deflector of claim 14 comprising a plurality of the beams such that one of the beams passes through and is deflected by each one of the first and second prisms.

23. The beam deflector of claim 14 further comprising (1) a positive microlens array disposed in front of the panel assembly such that the beam first passes through the positive microlens array before passing through the panel assembly and (2) a negative microlens array disposed behind the panel assembly such that the beam first passes through the panel assembly before passing through the negative microlens array.

24. The beam deflector of claim 14 further comprising (1) a positive microlens array disposed in front of the panel assembly such that the beam first passes through the positive microlens array before passing through the panel assembly and (2) a negative microlens array disposed between the positive microlens array and the panel assembly.

25. The beam deflector of claim 14 where in (1) the first array and the second array both comprise at least five prisms, (2) a first of the second prisms has a first width, a second of the second prisms has a second width, a third of the second prisms has a third width, a fourth of the second prisms has a fourth width, and a fifth of the second prisms has a fifth width, (3) none of the widths are the same, and (4) the sum of the first width, the second width, the third width, the fourth width, and the fifth width is greater than about one hundred times the wavelength of the beam for reducing diffraction noise.

26. The beam deflector of claim 14 wherein the panel assembly comprises at least about one inch in length and at least about one inch in height.

27. The beam deflector of claim 26 wherein the panel assembly is at least about 3.5 inches in length and at least about 3.5 inches in height.

28. The beam deflector of claim 27 wherein the panel assembly is no more than ten millimeters thick.

29. The beam deflector of claim 14 wherein the beam has a diameter of less than 100 $\mu$m and can be selectively deflected at an angle at least as much as about 30° as it passes through the panel assembly.

30. The beam deflector of claim 29 wherein the beam can be selectively deflected between about 0° and about 30°.

31. The beam deflector of claim 29 wherein the beam can be selectively deflected within about 0.5 milliradians of a desired angle of deflection.

32. The beam deflector of claim 29 wherein the beam is comprised of light having a wavelength between about 0.3 $\mu$m and about 30 $\mu$m.

33. The beam deflector of claim 29 wherein the beam is comprised of collimated light.

34. The beam deflector of claim 33 wherein the collimated light is produced by a laser.

35. The beam deflector of claim 34 wherein the beam is comprised of infrared light.

36. The beam deflector of claim 35 wherein the infrared light has a wavelength of between about 1.2 $\mu$m and about 1.5 $\mu$m.

37. The beam deflector of claim 14 comprising a pair of the panel assemblies such that one of the panel assemblies is disposed adjacent the other of the panel assemblies wherein the prisms of the first array of one of the panel assemblies are orthogonal to the prisms of the first array of the other of the panel assemblies and the prisms of the second array of the one of the panel assemblies are orthogonal to the prisms of the second array of the other of the panel assemblies such that one of the panel assemblies deflects the beam in one direction and the other of the panel assemblies deflects the beam in another direction.

38. The beam deflector of claim 37 wherein one of the panel assemblies deflects the beam in one dimension and the other of the panel assemblies deflects the beam in another dimension.

39. The beam deflector of claim 38 wherein one of the panel assemblies deflects the beam horizontally and the other of the panel assemblies deflects the beam vertically.

40. The beam deflector of claim 35 further comprising a polarizer plate disposed between the panel assemblies.

41. The beam deflector of claim 12 wherein the variable refractive index material is comprised of a liquid crystal.

42. The beam deflector of claim 41 wherein each of the plurality of first prisms is comprised of a ferroelectric liquid crystal.

43. The beam deflector of claim 41 wherein each of the plurality of first prisms is comprised of a nematic liquid crystal.

* * * * *